(12) United States Patent
Islam et al.

(10) Patent No.: US 12,185,274 B2
(45) Date of Patent: Dec. 31, 2024

(54) RESOURCE SHARING BETWEEN PAGING RESPONSE AND RANDOM ACCESS CHANNEL MESSAGE

(71) Applicant: QUALCOMM Incorporated, San Diego, CA (US)

(72) Inventors: Muhammad Nazmul Islam, Littleton, MA (US); Karl Georg Hampel, Hoboken, NJ (US); Junyi Li, Fairless Hills, PA (US)

( * ) Notice: Subject to any disclaimer, the term of this patent is extended or adjusted under 35 U.S.C. 154(b) by 583 days.

(21) Appl. No.: 17/476,706

(22) Filed: Sep. 16, 2021

(65) Prior Publication Data

US 2022/0007329 A1 Jan. 6, 2022

Related U.S. Application Data

(63) Continuation of application No. 15/942,199, filed on Mar. 30, 2018, now Pat. No. 11,153,846.
(Continued)

(51) Int. Cl.
*H04W 74/0833* (2024.01)
*H04L 67/5651* (2022.01)
(Continued)

(52) U.S. Cl.
CPC ....... *H04W 68/005* (2013.01); *H04L 67/5651* (2022.05); *H04L 69/04* (2013.01); *H04W 28/06* (2013.01); *H04W 68/00* (2013.01); *H04W 68/02* (2013.01); *H04W 68/025* (2013.01); *H04W 74/0833* (2013.01); *H04W 74/0866* (2013.01); *H04L 5/0053* (2013.01); *H04W 72/23* (2023.01); *H04W 72/231* (2023.01)

(58) Field of Classification Search
CPC ............... H04W 12/413; H04W 68/00; H04W 74/0833; H04W 72/231
See application file for complete search history.

(56) References Cited

U.S. PATENT DOCUMENTS 8,711,793 B2   4/2014   Lee et al.
8,909,268 B2   12/2014  Zeira et al.
(Continued)

FOREIGN PATENT DOCUMENTS

CN   102291845 A    12/2011
EP       2519066 A1 * 10/2012   ............ H04W 68/00
(Continued)

OTHER PUBLICATIONS

R1-1702909, "4-step random access procedure", Feb. 13-17, 2017, pp. 1-10 (Year: 2017).*
(Continued)

*Primary Examiner* — Salvador E Rivas

(57) ABSTRACT

Methods, systems, and devices for wireless communication are described. A base station may transmit a paging indicator message to one or more user equipment (UEs) in a group of UEs. The base station may receive, based at least in part on the paging indicator message, a first response message from the one or more UEs. The first response message may be received using a resource that is shared with a random access channel message for the group of UEs. The base station may transmit, based at least in part on the first response message, a second response message to the one or more UEs.

30 Claims, 17 Drawing Sheets

Related U.S. Application Data

(60) Provisional application No. 62/502,269, filed on May 5, 2017, provisional application No. 62/481,633, filed on Apr. 4, 2017.

(51) Int. Cl.
  *H04L 69/04* (2022.01)
  *H04W 28/06* (2009.01)
  *H04W 68/00* (2009.01)
  *H04W 68/02* (2009.01)
  *H04W 74/08* (2009.01)
  *H04L 5/00* (2006.01)
  *H04W 72/23* (2023.01)
  *H04W 72/231* (2023.01)

(56) References Cited

U.S. PATENT DOCUMENTS

| | | | |
|---|---|---|---|
| 2008/0293439 A1* | 11/2008 | Hus | H04W 68/00 455/458 |
| 2016/0143063 A1* | 5/2016 | Lin | H04W 74/0833 370/329 |
| 2016/0150573 A1 | 5/2016 | Pani et al. | |
| 2016/0227582 A1 | 8/2016 | Vajapeyam et al. | |
| 2016/0374048 A1 | 12/2016 | Griot et al. | |
| 2017/0013443 A1* | 1/2017 | Gopalakrishnan | H04W 8/186 |
| 2017/0094690 A1 | 3/2017 | Zhang et al. | |
| 2017/0230951 A1* | 8/2017 | Xiong | H04L 5/0053 |
| 2018/0139778 A1* | 5/2018 | Chou | H04W 74/04 |
| 2018/0288734 A1 | 10/2018 | Islam et al. | |
| 2020/0404617 A1 | 12/2020 | Murray et al. | |

FOREIGN PATENT DOCUMENTS

| | | |
|---|---|---|
| WO | WO2016048422 A1 | 3/2016 |
| WO | WO-2016204985 A1 | 12/2016 |

OTHER PUBLICATIONS

European Search Report—EP22208907—Search Authority—Berlin—Feb. 8, 2023.

International Preliminary Report on Patentability—PCT/US2018/025735, the International Bureau of WIPO—Geneva, Switzerland, Oct. 17, 2019.

International Search Report and Written Opinion—PCT/US2018/025735—ISA/EPO—Jun. 29, 2018.

Nokia, et al., "Configurable Paging Procedure for NR", 3GPP TSG-RAN WG2 #97bis, 3GPP Draft; R2-1702779, Configurable Paging Procedure for NR, 3rd Generation Partnership Project (3GPP), Mobile Competence Centre; 650, Route Des Lucioles; F-06921 Sophia-Antipolis Cedex; France, vol. RAN WG2, No. Spokane, USA; Apr. 3, 2017-Apr. 7, 2017 Mar. 25, 2017 (Mar. 25, 2017), XP051254276, Retrieved from the Internet: URL:http://www.3gpp.org/ftp/tsg_ran/WG2_RL2/TSGR2_97bis/Docs/ [retrieved on Mar. 25, 2017], 4 pages.

Nokia, et al., "Paging in NR at HF Operation", 3GPP TSG-RAN WG2 NR #97, 3GPP Draft; R2-1700807 Paging in NR at HF operation, 3rd Generation Partnership Project (3GPP), Mobile Competence Centre; 650, Route Des Lucioles; F-06921 Sophia-Antipolis Cedex; France, vol. RAN WG2, No. Athens, Greece; Feb. 13, 2017-Feb. 17, 2017, Feb. 4, 2017, XP051223231, Retrieved from the Internet: URL:http://www.3gpp.org/ftp/tsg_ran/WG2_RL2/TSGR2_97/Docs/ [retrieved on Feb. 4, 2017], 6 pages.

Qualcomm Incorporated: "Paging Design Consideration", 3GPP TSG-RAN WG1 Meeting NR#3, Nagoya, Japan, Sep. 18-21, 2017, R1-1716382, 10 pages.

Qualcomm Incorporated: "Paging Design Consideration," 3GPP TSG-RAN WG1 NR AdHoc, R1-1700789, Jan. 16-20, 2017, 3 pages.

* cited by examiner

RESOURCE SHARING BETWEEN PAGING RESPONSE AND RANDOM ACCESS CHANNEL MESSAGE

CROSS REFERENCES

The present Application for Patent is a Continuation of U.S. patent application Ser. No. 15/942,199 by Islam et al., entitled "Resource Sharing Between Paging Response and Random Access Channel Message" filed Mar. 30, 2018, which claims priority to U.S. Provisional Patent Application No. 62/481,633 by Islam, et al., entitled "Resource Sharing Between Paging Response and Random Access Channel Message," filed Apr. 4, 2017, and to U.S. Provisional Patent Application No. 62/502,269 by Islam et al., entitled "Resource Sharing Between Paging Response and Random Access Channel Message," filed May 5, 2017 and assigned to the assignee hereof.

BACKGROUND

The following relates generally to wireless communication, and more specifically to resource sharing between paging response and random access channel message.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Paging operations provide a mechanism for a base station to page a UE when downlink data is available for the UE, when system information changes, and the like. Paging operations may include base stations within a tracking area, for example, transmitting a paging indicator to a UE in an idle or radio resource control (RRC) inactive mode. The UE may respond with a paging response indicating that the paging indicator was received. The base station (e.g., the base station receiving the paging response) may respond with a paging message. In some instances, the UE may respond to the paging message by establishing an RRC connection with the base station, e.g., to exchange information. In one example, the RRC connection exchange may include the UE transmitting a random access channel (RACH) preamble message (e.g., RACH msg1), the base station responding with a RACH response message (e.g., RACH msg2), the UE responding with a RRC connection request message, and finally the base station responding with a RRC connection setup message. Other RACH messages and/or protocols may also be implemented. Conventional wireless communication systems, however, may use separate resources for the paging operations and the RACH process, which may increase system overhead.

SUMMARY

The described techniques relate to improved methods, systems, devices, or apparatuses that support resource sharing between paging responses and random access channel (RACH) messages. Generally, the described techniques provide for shared resources between paging messages and RACH messages. For example, a subset of RACH preamble resources is reserved for both paging responses and RACH transmissions. A UE may receive a paging indicator from the base station and use the shared resources when transmitting a response message (e.g., either a paging response or a RACH message (e.g., RACH msg1)). As the base station may not know, or have any indication of whether the first response message is a paging response or RACH message, the base station may transmit a response message (e.g., a second response message) based on considerations such as paging load, UE entry rate into the system, and the like. In some examples, the second response message from the base station may include a paging message (e.g., the base station disregards a RACH msg1 as the first response message). As another example, the second response message from the base station may include a RACH msg2. In some aspects, the RACH msg2 may include additional payload information, such as a paging message. While this example may incur additional overhead due to the additional bits in RACH msg2, the base station may adopt this approach when the UE entry rate into the system is high, e.g., above a threshold. The described techniques provide a mechanism where resources are conserved, and the base station varies its response depending on the current system status.

A method of wireless communication is described. The method may include transmitting, from a base station, a paging indicator message to one or more UEs in a group of UEs, receiving, based at least in part on the paging indicator message, a first response message from the one or more UEs, the first response message received using a resource that is shared with a RACH message for the group of UEs, and transmitting, based at least in part on the first response message, a second response message to the one or more UEs.

An apparatus for wireless communication is described. The apparatus may include means for transmitting, from a base station, a paging indicator message to one or more UEs in a group of UEs, means for receiving, based at least in part on the paging indicator message, a first response message from the one or more UEs, the first response message received using a resource that is shared with a RACH message for the group of UEs, and means for transmitting, based at least in part on the first response message, a second response message to the one or more UEs.

Another apparatus for wireless communication is described. The apparatus may include a processor, memory in electronic communication with the processor, and instructions stored in the memory. The instructions may be operable to cause the processor to transmit, from a base station, a paging indicator message to one or more UEs in a group of UEs, receive, based at least in part on the paging indicator message, a first response message from the one or more UEs, the first response message received using a resource that is shared with a RACH message for the group of UEs, and transmit, based at least in part on the first response message, a second response message to the one or more UEs.

A non-transitory computer readable medium for wireless communication is described. The non-transitory computer-readable medium may include instructions operable to cause a processor to transmit, from a base station, a paging indicator message to one or more UEs in a group of UEs, receive, based at least in part on the paging indicator message, a first response message from the one or more UEs, the first response message received using a resource that is shared with a RACH message for the group of UEs, and transmit, based at least in part on the first response message, a second response message to the one or more UEs.

Some examples of the method, apparatus, and non-transitory computer-readable medium described above may further include processes, features, means, or instructions for transmitting an indication of the resource that may be shared between the paging response message and the RACH message.

In some examples of the method, apparatus, and non-transitory computer-readable medium described above, the indication of the resource may be transmitted in at least one of a remaining minimum system information (RMSI), or a master information block (MIB), or an other system information (OSI), or a physical downlink control channel (PDCCH), or a physical downlink shared channel (PDSCH), or a radio resource control (RRC) message exchange, or a combination thereof.

Some examples of the method, apparatus, and non-transitory computer-readable medium described above may further include processes, features, means, or instructions for selecting a format for the second response message based at least in part on a current paging load, an UE entry rate, or a combination thereof.

Some examples of the method, apparatus, and non-transitory computer-readable medium described above may further include processes, features, means, or instructions for determining that the first response message comprises a paging response message. Some examples of the method, apparatus, and non-transitory computer-readable medium described above may further include processes, features, means, or instructions for transmitting a paging message as the second response message.

Some examples of the method, apparatus, and non-transitory computer-readable medium described above may further include processes, features, means, or instructions for receiving, based at least in part on the paging message, a RACH msg1 from the one or more UEs. Some examples of the method, apparatus, and non-transitory computer-readable medium described above may further include processes, features, means, or instructions for transmitting a RACH msg2 as a third response message.

Some examples of the method, apparatus, and non-transitory computer-readable medium described above may further include processes, features, means, or instructions for determining that the first response message comprises a RACH msg1. Some examples of the method, apparatus, and non-transitory computer-readable medium described above may further include processes, features, means, or instructions for transmitting a RACH msg2 as the second response message.

Some examples of the method, apparatus, and non-transitory computer-readable medium described above may further include processes, features, means, or instructions for receiving, based at least in part on the RACH msg2, a message from the one or more UEs, wherein the message conveys an indication that the one or more UEs may have responded to the paging indicator. Some examples of the method, apparatus, and non-transitory computer-readable medium described above may further include processes, features, means, or instructions for transmitting a paging message as a third response message. In some examples of the method, apparatus, and non-transitory computer-readable medium described above, the paging message is transmitted in a RACH message. In some examples of the method, apparatus, and non-transitory computer-readable medium described above, the RACH message is a RACH preamble message.

Some examples of the method, apparatus, and non-transitory computer-readable medium described above may further include processes, features, means, or instructions for receiving, based at least in part on the RACH msg2, a RACH msg3 from the one or more UEs. Some examples of the method, apparatus, and non-transitory computer-readable medium described above may further include processes, features, means, or instructions for transmitting a connection establishment message as a third response message.

Some examples of the method, apparatus, and non-transitory computer-readable medium described above may further include processes, features, means, or instructions for transmitting a random access response message as the second response message, wherein the random access response message comprises a paging record. Some examples of the method, apparatus, and non-transitory computer-readable medium described above may further include processes, features, means, or instructions for determining that the first response message comprises a paging response message, wherein the random access response message is transmitted based at least in part on the determining. Some examples of the method, apparatus, and non-transitory computer-readable medium described above may further include processes, features, means, or instructions for matching a RACH preamble of the first response message to a set of pre-allocated RACH preambles for a RACH msg1, wherein the determining that the first response message comprises a paging response message based at least in part on the matching. Some examples of the method, apparatus, and non-transitory computer-readable medium described above may further include processes, features, means, or instructions for receiving a RACH msg3 from the UE based at least in part on the paging record being associated with the UE. Some examples of the method, apparatus, and non-transitory computer-readable medium described above may further include processes, features, means, or instructions for receiving a RACH msg3 from the UE that comprises a RACH termination indication based at least in part on the paging record not being associated with the UE.

In some examples of the method, apparatus, and non-transitory computer-readable medium described above, the paging indicator is transmitted to the group of UEs in a group-specific paging signal.

A method of wireless communication is described. The method may include receiving, at a UE, an indication of a resource that is shared with a RACH message, receiving, from a base station, a paging indicator message, selecting at least one of the paging response message or the RACH message as a first response message to the paging indicator message, and transmitting the first response message to the base station using the resource.

An apparatus for wireless communication is described. The apparatus may include means for receiving, at a UE, an indication of a resource that is shared with a RACH message, means for receiving, from a base station, a paging indicator message, means for selecting at least one of the paging response message or the RACH message as a first response message to the paging indicator message, and means for transmitting the first response message to the base station using the resource.

Another apparatus for wireless communication is described. The apparatus may include a processor, memory in electronic communication with the processor, and instructions stored in the memory. The instructions may be operable to cause the processor to receive, at a UE, an indication of a resource that is shared with a RACH message, receive, from a base station, a paging indicator message, select at least one of the paging response message or the RACH message as a first response message to the paging indicator message, and transmit the first response message to the base station using the resource.

A non-transitory computer readable medium for wireless communication is described. The non-transitory computer-readable medium may include instructions operable to cause a processor to receive, at a UE, an indication of a resource that is shared with a RACH message, receive, from a base station, a paging indicator message, select at least one of the paging response message or the RACH message as a first response message to the paging indicator message, and transmit the first response message to the base station using the resource.

Some examples of the method, apparatus, and non-transitory computer-readable medium described above may further include processes, features, means, or instructions for receiving a second response message from the base station. Some examples of the method, apparatus, and non-transitory computer-readable medium described above may further include processes, features, means, or instructions for selecting, based at least in part on the second response message, a third response message for transmission to the base station, the third response message comprising a RACH msg1, a RACH msg3, or a message conveying an indication that the UE may have responded to the paging indicator.

Some examples of the method, apparatus, and non-transitory computer-readable medium described above may further include processes, features, means, or instructions for receiving the indication of the resource in at least one of a RMSI, or a MIB, or a OSI, or a PDCCH, or a PDSCH, or a RRC message exchange, or a combination thereof.

In some examples of the method, apparatus, and non-transitory computer-readable medium described above, the paging indicator is received in a group-specific paging signal.

DETAILED DESCRIPTION

Conventional wireless communication systems may use one set of dedicated resources for paging response messages and a second set of dedicated resources for random access channel (RACH) messages. For example, a set of paging resources may be reserved and used by UEs for responding to paging indication messages (e.g., for transmitting paging response messages). Additionally, a set of RACH preamble resources may be reserved and used by UEs for initiating a radio resource control (RRC) connection establishment procedure. The RACH preamble resources may be reserved for a set of UEs, where UEs select a RACH preamble from the reserved resources for transmitting a RACH preamble message (e.g., msg1) to establish an RRC connection. Such conventional techniques, however, incur substantial overhead due to the different sets of reserved resources.

Aspects of the disclosure are initially described in the context of a wireless communication system. For example, resources may be shared between paging messages and RACH messages. The shared resources may include all or a subset of RACH preambles otherwise reserved for a group of UEs to transmit RACH messages (e.g., RACH msg1). A base station may transmit an indication to UEs that the resources are being shared. The base station may then transmit a paging indicator message to UE(s) and receive a response message from the UE(s) based on the paging indicator. The response message (e.g., first response message) may be a paging response message or a RACH message (e.g., msg1). The base station may transmit a second response message to the UE(s) that is selected based on the first response message from the UE(s). In one example, the second response message may be a paging message (e.g., based on a determination and/or assumption that the first response message was a paging response message). In another example, the second response message may be a RACH message (e.g., a RACH msg2 based on a determination and/or assumption that the first response message was a RACH msg1). In some aspects, the base station may vary how it responds to the first response message (e.g., vary which second response message is transmitted) based on various factors, such as a paging load and/or a UE entry rate into the system. The UE(s) may receive the indication that resources are shared and select a format for the first response message accordingly, e.g., based on whether or not the UE seeks to establish an RRC connection with the base station.

Aspects of the disclosure are further illustrated by and described with reference to apparatus diagrams, system diagrams, and flowcharts that relate to resource sharing between paging response and random access channel message.

Figure 1:
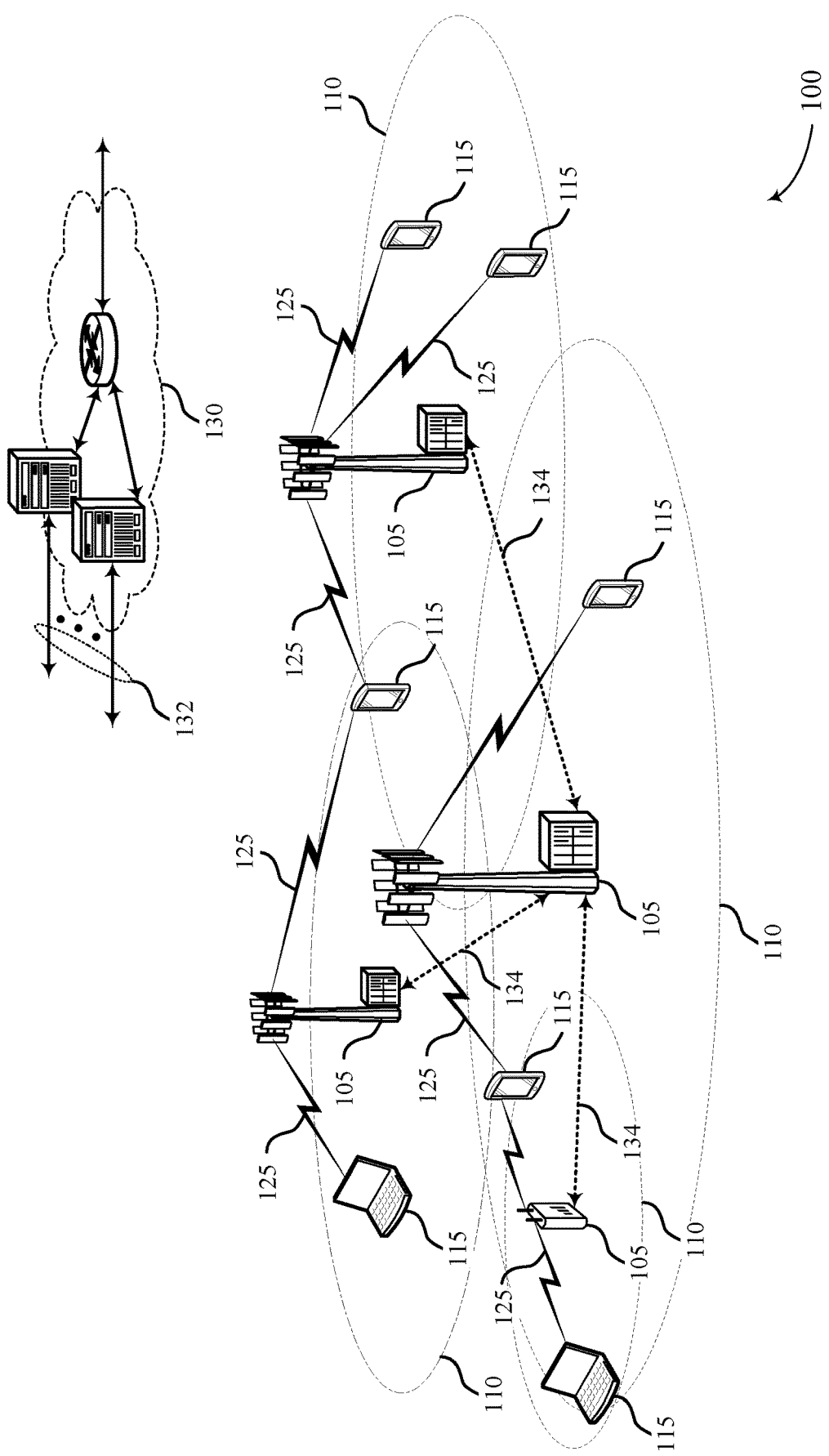
FIG. 1 illustrates an example of a system for wireless communication that supports resource sharing between paging response and random access channel message in accordance with aspects of the present disclosure.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a Long Term Evolution (LTE), LTE-Advanced (LTE-A) network, or a New Radio (NR) network. In some cases, wireless communication system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communication system 100 may include uplink transmissions from a UE 115 to a base station 105, or downlink transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication systems may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) or gNodeBs (105).

A base station 105 may be connected by an S1 interface to the core network 130. The core network may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, Internet Protocol (IP) connectivity, and other access, routing, or mobility functions. At least some of the network devices, such as base station 105, may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station 105) and a receiver (e.g., a UE 115), where both transmitter and receiver are equipped with multiple antennas. Some portions of wireless communication system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. In the control plane, the Radio Resource Control (RRC) protocol layer may provide establishment, configuration, and maintenance of an RRC connection between a UE 115 and a network device, base station 105, or core network 130 supporting radio bearers for user plane data. At the Physical (PHY) layer, transport channels may be mapped to physical channels.

Time intervals in LTE or NR may be expressed in multiples of a basic time unit. Time resources may be organized according to radio frames of length of 10 ms, which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases, the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communication system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link).

An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communication system 100 may utilize both licensed and unlicensed radio frequency spectrum bands. For example, wireless communication system 100 may employ LTE License Assisted Access (LTE-LAA) or LTE Unlicensed radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

A base station 105 may be configured to support aspects of the described techniques for shared resources. For example, the base station 105 may transmit a paging indicator message to UE(s) in a group of UEs. The base station 105 may receive, based at least in part on the paging indicator message, a first response message from the UE(s), the first response message received using a resource that is shared with a RACH message for the group of UE(s). The base station 105 may transmit, based at least in part on the first response message, a second response message to the UE(s).

A UE 115 may also be configured to support aspects of the described techniques for shared resources. For example, the UE 115 may receive an indication of a resource that is shared with a RACH message. The UE 115 may receive, from a base station 105, a paging indicator message. The UE 115 may select at least one of the paging response message or the RACH message as a first response message to the paging indicator message. The UE 115 may transmit the first response message to the base station 105 using the resource (e.g., the shared resource).

Figure 2:
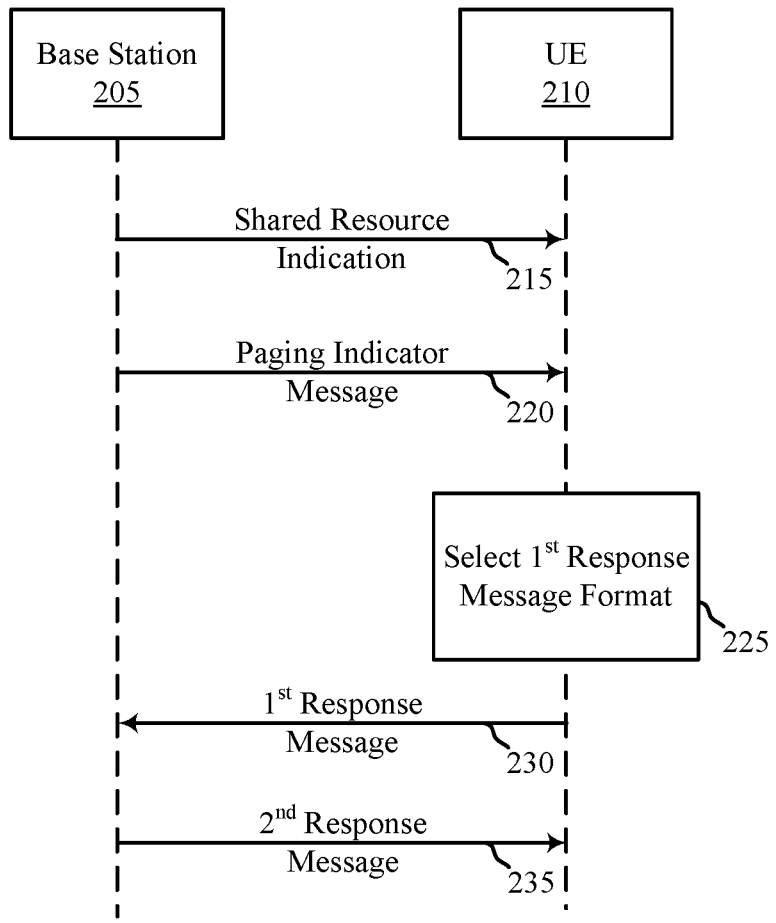
FIG. 2 illustrates an example of a process that supports resource sharing between paging response and random access channel message in accordance with aspects of the present disclosure.

FIG. 2 illustrates an example of a process 200 that supports resource sharing between paging response and RACH message in accordance with various aspects of the present disclosure. In some examples, process 200 may implement aspects of wireless communication system 100. Process 200 may include a base station 205 and a UE 210, which may be examples of the corresponding devices described herein. Broadly, process 200 illustrates one example of shared paging and RACH message resources between the base station 205 and the UE 210.

Generally, aspects of process 200 may include base station 205 transmitting a paging indication to UE 210. In some aspects, no dedicated preamble is reserved for collecting a response from UE 210. Instead, a subset of RACH preambles (e.g., resources associated with a physical RACH (PRACH)) are reserved for both paging response and PRACH transmissions. UE 210 may transmit a response using one of the reserved preambles. When base station 205 receives the reserved preamble, the base station 205 may not know whether the preamble is reserved for paging response of PRACH msg1.

Accordingly, base station 205 may use various choices to respond to this response. One non-limiting choice may include base station 205 disregarding the PRACH msg1 that might have used those preambles. Instead, base station 250 may transmit a paging message to the direction from where it received the response. If the UE 210 selected this preamble as a response to the paging indication, UE 210 may receive the paging message and the system may not incur any additional overhead.

In a second non-limiting choice, base station 205 may transmit a RACH msg2 to the direction from where it received the response. The RACH msg2 payload may contain conventional parameters and, in some instances, may also contain paging message information. This may allow the RACH msg2 to be served for both types of UEs, e.g., UEs that want to RACH to the system and UEs that want to receive paging messages corresponding to the paging indication. This may increase overhead of the system since RACH msg2 of this procedure may contain additional bits. Thus, in some aspects, base station 205 may vary how it responds to the first response message based on various factors.

At 215, base station 205 may transmit (and UE 210 may receive) an indication of the shared resources. The shared resource indicator may carry or otherwise convey an indication that the resource is shared, e.g., between a paging response message and a RACH message (e.g., RACH preamble message/msg1). The shared resource indicator may be transmitted in a remaining minimum system information (RMSI), in a master information block (MIB), in an other system information (OSI), in a physical downlink control channel (PDCCH), in a physical downlink shared channel (PDSCH), during an RRC exchange between base station 205 and UE 210, or in any combination thereof.

In some aspects, the indication may be carried in different carriers than are used for the paging indication and response messages. For example, base station 205 may transmit the indication via an LTE/LTE-A and/or NR network (e.g., sub-6 GHz network) and then the paging indicator and response messages may be transmitted over a mmW wireless network (e.g., in a beamformed transmission).

At 220, base station 205 may transmit (and UE 210 may receive) a paging indicator message. The paging indicator message may be transmitted to UE(s) within a group of UEs, e.g., to a group of UEs that includes UE 210. In some aspects, the paging indicator may be transmitted on a paging indicator channel (PICH) and carry or otherwise convey an indication to UE 210 that there is a paging message on an associated paging channel.

In some aspects, the paging indicator is transmitted in a group-specific paging signal. For example, base station 205 may inform UE 210 whether it needs to be paged or not by including 40 bit UE identifier (ID) in the PDSCH carrying the paging payload. When the UEs are divided into different groups, if downlink data arrives for at least one UE (e.g., UE 210), base station 205 may use N bits (N<=40) to page all UEs in the group to convey that at least one member of the group has downlink data.

At 225, UE 210 may select a format for the first response message. For example, the UE 210 may select a paging response message or a RACH message (e.g., msg1) to use to respond to the paging indicator. In some aspects, UE 210 may select a paging response message as the first response message when, for example, the UE 210 does not have a current need to establish an active RRC connection with the base station 205, e.g., when the UE 210 does not have any uplink traffic to send, when the system settings are current or recently updated, and the like.

In some aspects, UE 210 may select a RACH message as the first response message when, for example, UE 210 needs to establish an active RRC connection with base station 205, e.g., when UE 210 has uplink traffic to send, to update system settings, and the like. Other considerations may also be included when determining the format for the first response message, e.g., whether the first response message is a paging response message or a RACH message.

At 230, UE 210 may transmit (and base station 205 may receive) the first response message. The first response message may have a format based on step 225 and may include either a paging response message or a RACH message. Thus, base station 205 may receive the first response message that may be a paging response message on resources that are shared with other UEs to transmit RACH messages.

At 235, base station 205 may transmit (and UE 210 may receive) a second response message. The second response message may be based on the first response message, e.g., based on a determination and/or assumption of whether the first response message was a paging response message or a RACH message. In some aspects, the second response message may be a paging message or a RACH message (e.g., a RACH msg2).

In some aspects, base station 205 may vary how it responds to the first response message based on certain considerations. One example may include the current paging load. For example, a high paging load may indicate that the first response message was more likely a paging response message and therefore a paging message as the second response message is appropriate. On the contrary, a low paging load may indicate that the first response message was more likely a RACH message (e.g., msg1) and therefore a RACH message (msg2) as the second response message is appropriate.

Another example may include the UE entry rate into the system. For example, base station 205 may determine that there is a high UE entry rate into the system (e.g., due to high mobility, handover, etc.) and base the format for the second response message accordingly. A high UE entry rate into the system may indicate that the first response message was a RACH message (msg1) and therefore a RACH message (e.g., msg2) for the second response message may be appropriate. On the contrary, a low UE entry rate into the system may indicate that the first response message was a paging response message and therefore a paging message for the second response message is appropriate.

In some aspects, base station 205 may consider both of the paging load and the UE entry rate when selecting a format for the second response message.

In some aspects, the second response message may be a paging message. For example, the base station 205 may determine that the first response message is a paging response message and respond with a paging message as the second response message. UE 210 may receive the paging message and respond with a RACH message (e.g., RACH msg1). Base station 205 may respond to the RACH msg1 with a RACH msg2 message as a third response message to initiate an RRC connection procedure with UE 210. In some aspects, the second response message may comprise a random access response message, such as a paging message.

In some aspects, the second response message may be a RACH message. For example, the base station 205 may determine that the first response message is a RACH msg1 and respond with a RACH msg2 as the second response message. UE 210 may receive the RACH msg2 and respond with a message that carries or otherwise conveys an indication that the UE 210 has responded to the paging indicator (e.g., previously responded). Base station 205 may respond to the message with a paging message as the third response message.

Figure 3:
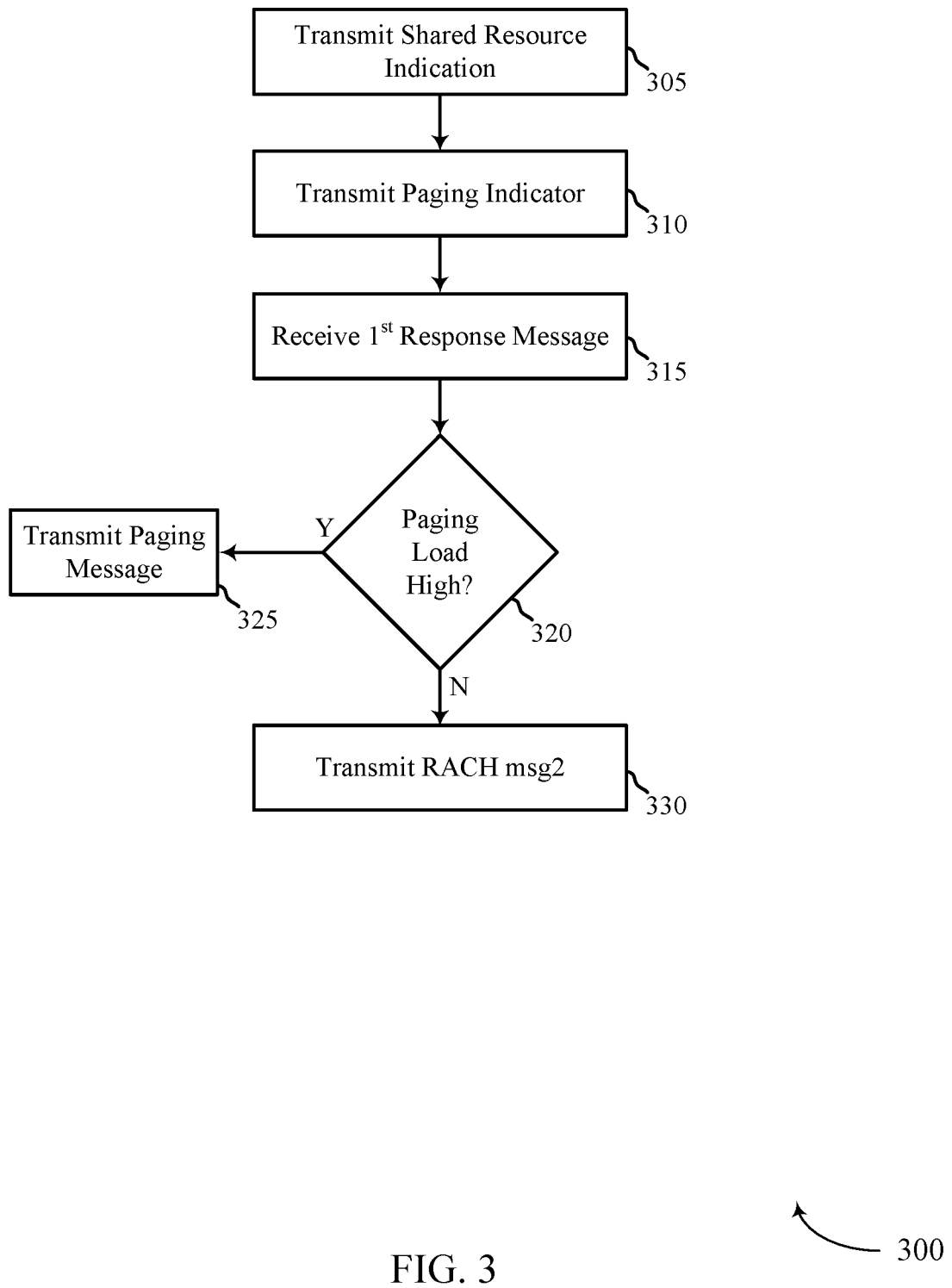
FIG. 3 illustrates an example of a flowchart that supports resource sharing between paging response and random access channel message in accordance with aspects of the present disclosure.

FIG. 3 illustrates an example of a flowchart 300 that supports resource sharing between paging response and RACH message in accordance with various aspects of the present disclosure. In some examples, flowchart 300 may implement aspects of wireless communication system 100 and/or process 200. Flowchart 300 may be implemented by a base station, which may be an example of the corresponding devices described herein.

At 305, the base station may transmit an indication of the shared resources. The shared resource indicator may carry or otherwise convey an indication that the resource is shared, e.g., between a paging response message and a RACH message (e.g., RACH preamble message/msg1). The shared resource indicator may be transmitted in a RMSI, in a MIB, in an OSI, in a PDCCH, in a PDSCH, during an RRC exchange, and the like.

At 310, the base station may transmit a paging indicator message. The paging indicator message may be transmitted to UE(s) within a group of UEs. In some aspects, the paging indicator may be transmitted on a PICH and carry or otherwise convey an indication to the group of UEs that there are paging messages on an associated paging channel.

At 315, the base station may receive a first response message from the UE, e.g., a first response message transmitted in response to the paging indicator. The first response message may be a paging response message or a RACH message (e.g., msg1). Thus, the base station may receive the first response message that may be a paging response message on resources that are shared with other UEs to transmit RACH messages.

At 320, the base station may determine whether the paging load is high. For example, the base station may monitor the number of paging procedures have been conducted with UEs over a predetermine time period, over a sliding window, etc. In some aspects, the base station may determine whether the paging load is high based on information received from a network (e.g., MME).

In some aspects, a high paging load may indicate that the first response message was more likely a paging response message and therefore at 325 the base station may transmit a paging message as the second response message. For example, if the paging load is above a threshold level, the base station may determine that the paging response message as the first response messages are more common and therefore a paging message is most likely the best response.

On the contrary, a low paging load may indicate that the first response message was more likely a RACH message (e.g., msg1) and therefore at 330 the base station may transmit a RACH message (msg2) as the second response message. For example, if the paging load is below a threshold level, the base station may determine that the RACH msg1 as the first response messages are more common and therefore a RACH msg2 is most likely the best response.

Figure 4:
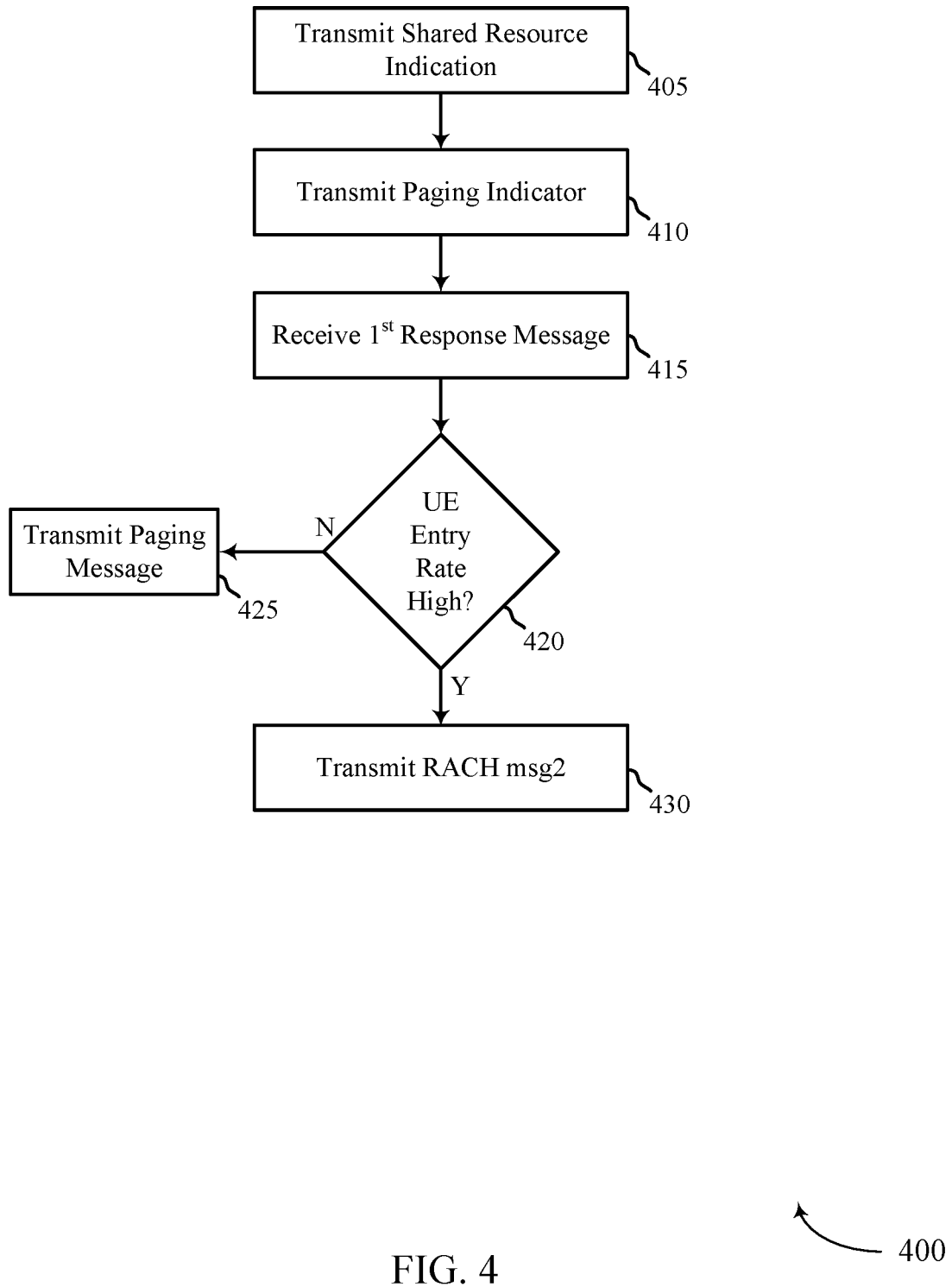
FIG. 4 illustrates an example of a flowchart that supports resource sharing between paging response and random access channel message in accordance with aspects of the present disclosure.

FIG. 4 illustrates an example of a flowchart 400 that supports resource sharing between paging response and RACH message in accordance with various aspects of the present disclosure. In some examples, flowchart 400 may implement aspects of wireless communication system 100 and/or process 200. Flowchart 400 may be implemented by a base station, which may be an example of the corresponding devices described herein.

At 405, the base station may transmit an indication of the shared resources. The shared resource indicator may carry or otherwise convey an indication that the resource is shared, e.g., between a paging response message and a RACH message (e.g., RACH preamble message/msg1). The shared resource indicator may be transmitted in a RMSI, in a MIB, in an OSI, in a PDCCH, in a PDSCH, during an RRC exchange, and the like.

At 410, the base station may transmit a paging indicator message. The paging indicator message may be transmitted to UE(s) within a group of UEs. In some aspects, the paging indicator may be transmitted on a PICH and carry or otherwise convey an indication to the group of UEs that there are paging messages on an associated paging channel.

At 415, the base station may receive a first response message from the UE, e.g., a first response message transmitted in response to the paging indicator. The first response message may be a paging response message or a RACH message (e.g., msg1). Thus, the base station may receive the first response message that may be a paging response message on resources that are shared with other UEs to transmit RACH messages.

At 420, the base station may determine whether the UE entry rate for the system is high. For example, the base station may monitor the number of initial connection and/or reconnection requests received from UEs over a predetermine time period, over a sliding window, etc. In some aspects, the base station may determine whether the UE entry rate is high based on information received from a network (e.g., MME).

In some aspects, a low UE entry rate may indicate that the first response message was more likely a paging response message and therefore at 425 the base station may transmit a paging message as the second response message. For example, if the UE entry rate is below a threshold level, the base station may determine that the paging response message as the first response messages are more common and therefore a paging message is most likely the best response.

On the contrary, a high UE entry rate may indicate that the first response message was more likely a RACH message (e.g., msg1) and therefore at 430 the base station may transmit a RACH message (msg2) as the second response message. For example, if the UE entry rate is above a threshold level, the base station may determine that the RACH msg1 as the first response messages are more common and therefore a RACH msg2 is most likely the best response.

Figure 5:
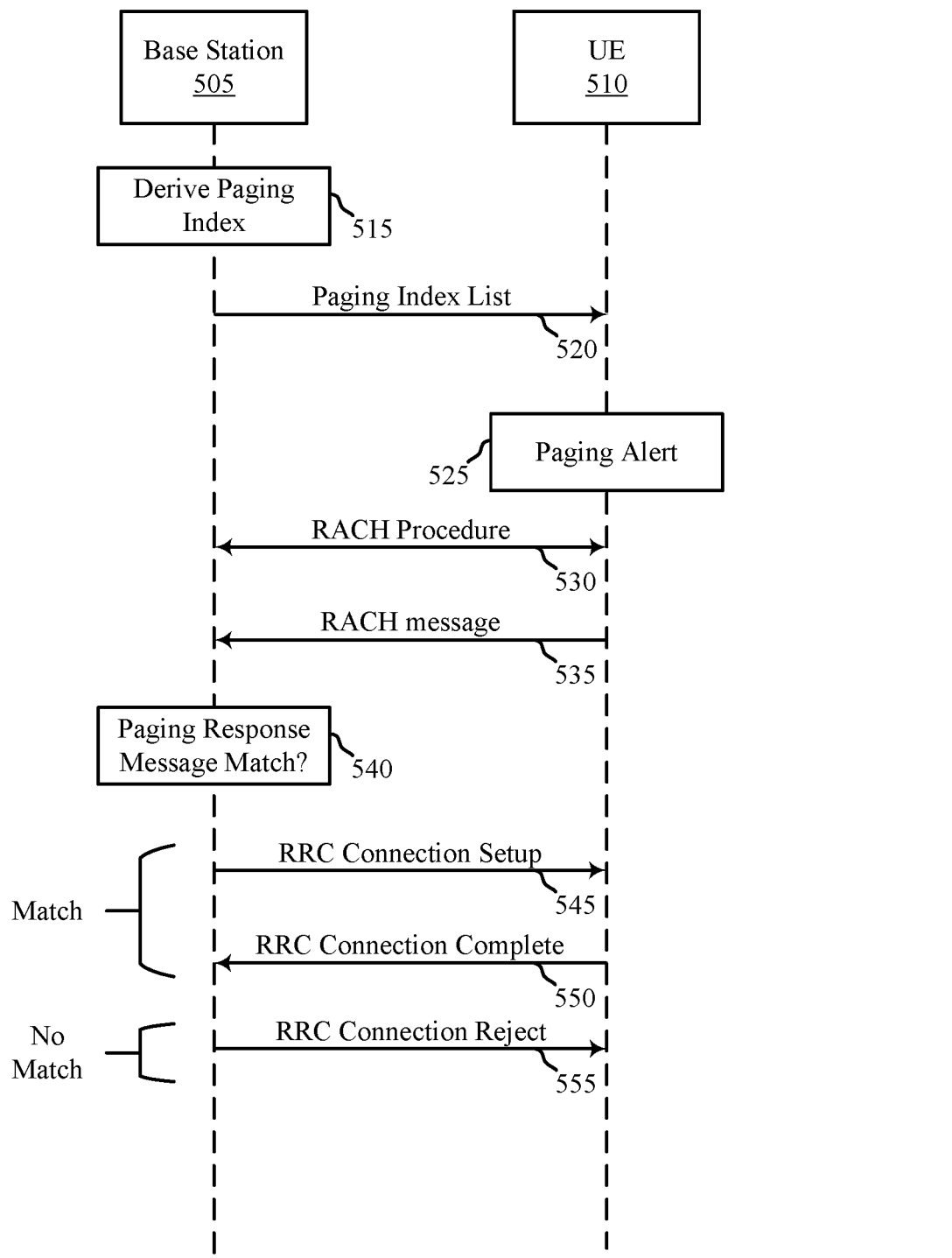
FIG. 5 illustrates an example of a process that supports resource sharing between paging response and random access channel message in accordance with aspects of the present disclosure.

FIG. 5 illustrates an example of a process 500 that supports resource sharing between paging response and RACH message in accordance with various aspects of the present disclosure. In some examples, process 500 may implement aspects of wireless communication system 100, process 200, and/or flowcharts 300/400, as described herein. Process 500 may include a base station 505 and a UE 510, which may be examples of the corresponding devices described herein. Broadly, process 500 illustrates one example of false paging alert resolution in an RRC connection procedure.

In some aspects, index-based paging may improve downlink efficiency, e.g., particularly in a multi-beam scenario (e.g., mmW networks) where broadcast information is delivered via a beam sweeping operation. In some aspects, process 500 may illustrate an index-based paging mechanism where verification of the paging alert is embedded in the paging response procedure. This may avoid or minimize any additional signaling for actual paging alerts.

In multi-beam scenarios, broadcast transmissions (such as is used for delivery of paging messages) may be conducted via beam sweep. Due to the large number of beams on the gNB side (e.g., base station 505), the broadcast transmissions may become inefficient. One example of estimating the downlink capacity overhead associated with paging for multi-beam systems may include the paging overhead in multi-beam scenarios, e.g., using HF bands, depending on the number of beam directions that the gNB is to sweep and the number of gNB antenna arrays. The number of synchronization signal (SS) block(s) in a SS burst set may be considered as an equivalent term to this ratio because gNB may decide the number of SS blocks based on the number of directions it is to sweep and its number of antenna arrays. Hence, the same number of SS blocks may be used instead of the number of beam directions and the number of antenna arrays to analyze the downlink paging overhead.

Factors to use when analyzing the downlink paging overhead may include the number of SS blocks per SS burst set. The number of SS blocks may denote the ratio of the number of downlink transmit beams and gNB antenna arrays that the gNB uses to transmit synchronization and paging signals. The UE identifier size (U) may also be used (e.g., the paging message may include the UE identifier, which may be 40 bits in some examples). The paging rate (P) may also be used, e.g., the number the UEs paged per second. The spectral efficiency (E) may also be used, which may be expressed in bits-per-second (bps)/Hz. This may allow focusing on the cell edge spectral efficiency for the analysis. The carrier bandwidth (B) may also be used, which may be expressed in unit Hz. Using these parameters, the downlink paging overhead may be calculated using the formula:

$$DL \text{ Paging Overhead} = \frac{\text{Number of SS Blocks} \cdot \text{Paging Rate} \cdot \textit{UE ID} \text{ Size}}{\text{Spectral Efficiency} \cdot \text{Carrier Bandwidth}}$$

In some LTE networks, each SS burst set may include only one SS block. However, in some mmW networks each SS burst set may have as many as 64 SS blocks. On the other hand, LTE may use 20 MHz bandwidth whereas a component carrier of a mmW network may have 100 MHz bandwidth. The cell edge spectral efficiency in an LTE network may be 0.1 bps/Hz. This may suggest that spectral efficiency of 0.225 bps/Hz at the cell edge for next generation networks (e.g., NR networks). Using this information, it may be shown that LTE networks consume approximately 13% of downlink capacity at maximum paging rate of 6,400 UEs per second. In mmW networks, the downlink capacity demand for the same paging rate may be substantially higher, e.g., up to 73% of the downlink capacity for 64 SS blocks. This is 5-6 times higher than the corresponding capacity demand for paging in LTE networks.

To address this, aspects of the present disclosure may provide for reduction of the downlink overhead through compression of the paging records. Such compression may be used on a hash applied to the UE identifier, such as the S-TMSI (SAE temporary mobile subscriber identity) or the IMSI (international mobile subscribers identity) that is contained in the paging record. The compression may also be based on a truncation of the UE identifier. In some aspects, the compression may be based on replacing the UE identifier with a group identifier, e.g., when the UE has been associated with such a group at some point. Other compression methods are possible. The compressed form of the UE identifier may be referred to as a paging index and the paging broadcast may contain only the paging indexes. After compression, the gNB may broadcast a paging index of X bits instead of the UE identifier of 40 bits (for example), which reduces the downlink paging overhead by a factor of 40/X. For example, if X=14 bits, the broadcast overhead is reduced by a factor of nearly three.

In some aspects, the gNB (e.g., base station 505) may also determine the paging index size. For example, to obtain sufficiently large resource gains in broadcasting the paging messages, lossy compression may be applied. Such lossy compression may lead to false paging alerts since a paging index may map to multiple UE identifiers, among which only one or a subset of UEs were intended to be paged. False paging alerts due to paging index use based paging mechanisms may be reduced by appropriately selecting the paging index size. For example, LTE may transmit 16 paging messages in each paging occasion and the paging occasion may occur four times in every 10 milliseconds (ms). For an index size of X bits, the probability to receive a false paging alert may amount to approximately $16*2^{-x}$. Assuming X=14 bits, the probability of a false alert becomes less than $10^{-3}$, which translates into one false alert in more than 1,000×320 ms=5½ minutes, e.g., in a worst-case scenario. Lower false alert rates may be realized.

Since lossy compression may invoke some non-zero probability of false paging alerts, the UE may verify if such a false alert has occurred. This evaluation may use as little resources as possible, especially for genuine paging alerts. Process 500 illustrates an index-based paging method where the UE proceeds as if the paging alert was genuine and starts with procedures to establish a connection to the network to retrieve the data that is waiting for delivery. The verification of the paging alert may then be embedded into the standard connection procedures and, therefore no additional signaling is needed when the paging alert was genuine. Thus, process 500 illustrates one example of false paging alert resolution in RRC connection establishment procedure.

At 515, base station 505 (e.g., the gNB) may derive a paging index. The paging index list may be derived using some or all of the compression techniques discussed above.

At 520, base station 505 may transmit a paging index list. In some aspects, the paging index list may be broadcasted, and the broadcast may carry or otherwise convey an indicator that compression was used or whether the full paging record list is being transmitted (e.g., the full list of UE identifiers). This may provide for base station 505 to resort to more traditional paging approaches when the paging load is low. The broadcast may also include an indication of the UE identifier type that is contained in the paging index list, e.g., S-TMSI, IMSI, etc. This indicator may be provided per index or per group of indices of the same type.

At 525, the UE 510 may receive the paging alert and determine that the paging index list indicates that a paging message is intended for UE 510, e.g., that the paging message is genuine.

At 530, UE 510 may initiate a RACH procedure with base station 505 based on receiving the index-based paging alert. The UE 505 may attempt to establish the RRC connection to retrieve the data waiting for download.

At 535, the RACH procedure may include UE 510 transmitting a RACH message to base station 505. The RACH message may be a RRC connection request message. The RACH message may include the UE identifier. In some aspects, the RACH message may include a paging response indicator, e.g., an indicator that the RRC connection request message is being sent in response to the paging message.

At 540, the base station 505 may determine if the paging response message includes a match. For example, since the RACH message includes the UE identifier, the network may verify if this UE identifier matches an entry in the paging record list. In case there is a match, the network may accept the RRC connection request message and therefore no additional overhead is introduced for genuine paging alerts. Thus, at 545 the base station 505 may transmit a RRC connection setup message to establish the RRC connection and at 550 the UE 510 may transmit a RRC connection complete message to confirm establishment of the RRC connection.

If, however, if no match is found, the network may conclude that the false paging alert has occurred and consequently may reject the RRC connection request. For example, and at 555, the base station 505 may transmit a RRC connection reject message. The RRC connection reject message may include the reason for the rejection. The overhead associated with the unsuccessful connection establishment attempt remains as small as the false-page alert probability. This can be set by the degree of compression applied to the paging message, e.g., the index size, as discussed above.

The network may apply the matching operation only for connection establishment attempts that occur in response to a paging broadcast. To distinguish paging-based connection establishment attempts from those of other nature(s), the UE 510 may include a paging response indication when requesting the connection establishment. In some aspects, the base station 505 may apply the matching operation only if this indication is included.

Figure 6:
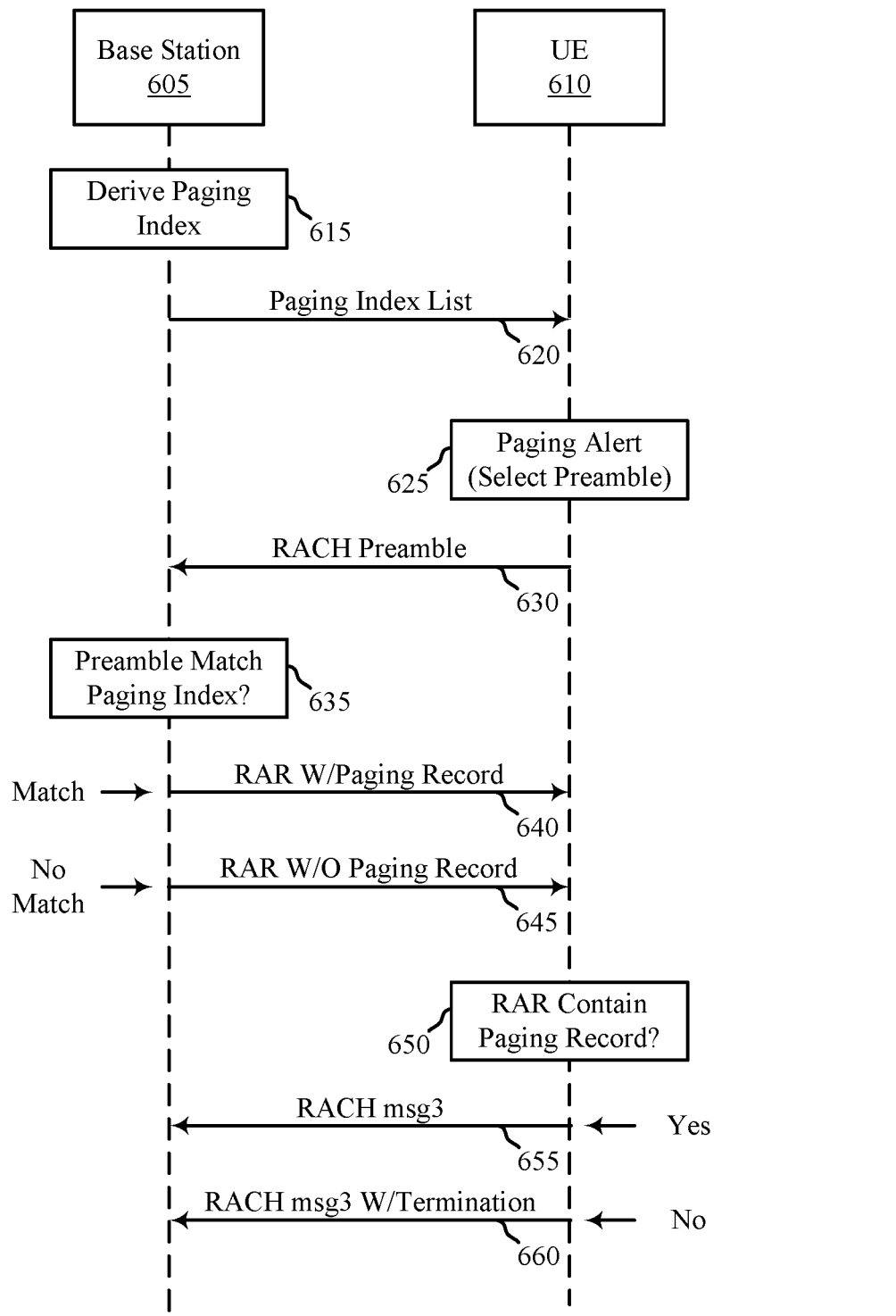
FIG. 6 illustrates an example of a process that supports resource sharing between paging response and random access channel message in accordance with aspects of the present disclosure.

FIG. 6 illustrates an example of a process 600 that supports resource sharing between paging response and RACH message in accordance with various aspects of the present disclosure. In some examples, process 600 may implement aspects of wireless communication system 100, processes 200/500, and/or flowcharts 300/400, as described herein. Process 200 may include a base station 205 and a UE 210, which may be examples of the corresponding devices described herein. Broadly, process 600 illustrates one example of false paging alert resolution in an RRC connection procedure. Generally, aspects of process 600 provide for an index-based paging mechanism with alert verification during the RACH procedure.

In some aspects, process 600 illustrates an example where index-based paging verification is embedded in the random-access procedure. The UE (e.g., UE 610) receiving the alert starts the random access procedure by sending a preamble on the random access channel. The UE selects the preamble based on a mapping to the index that caused the paging alert. This mapping may be pre-configured by the network. In this manner, the gNB (e.g., base station 605) can find the associated paging index that alerted the UE.

The gNB receiving the preamble in succession to a paging broadcast evaluates if the preamble matches a mappings to any of the paging indexes broadcast before. In case such a match is found, the gNB includes the paging record pertaining to this index in the random access response (msg2). This allows the UE to verify if the paging alert was genuine or false. In case the paging alert was false, the UE includes a Random-Access-Termination Indication into MSG 3 of the paging procedure. Otherwise it proceeds with the paging procedure and RRC connection establishment in conventional manner to retrieve data waiting for it on the network.

At 615, base station 605 (e.g., the gNB) may derive a paging index. The paging index list may be derived using some or all of the compression techniques discussed above.

At 620, base station 605 may transmit a paging index list. In some aspects, the paging index list may be broadcasted, and the broadcast may carry or otherwise convey an indicator that compression was used or whether the full paging record list is being transmitted (e.g., the full list of UE identifiers). This may provide for base station 605 to resort to more traditional paging approaches when the paging load is low. The broadcast may also include an indication of the UE identifier type that is contained in the paging index list, e.g., S-TMSI, IMSI, etc. This indicator may be provided per index or per group of indices of the same type.

At 625, the UE 610 may receive the paging alert and determine that the paging index list indicates that a paging message is intended for UE 610, e.g., that the paging message is genuine. The UE 610 receiving the paging alert may start the random access procedure where, at 630, the UE 610 transmits a RACH preamble to base station 605 on the PRACH. UE 610 may select the preamble based on a mapping to the index that caused the paging alert. This mapping may be pre-configured by the network. In this manner, the base station 605 may find the associated paging index that alerted the UE 610.

At 635, base station 605 determines if a preamble match has occurred. For example, base station 610 may evaluate if the RACH preamble matches mapping to the paging index list. In some aspects, base station 610 receiving the RACH preamble in succession to a paging broadcast may provide for the base station 605 to evaluate if the preamble matches a mapping to any of the paging indexes broadcast before. In case such a match is found, at 640 the base station 610 may include the paging record pertaining to this paging index in the random access response (RAR) message (e.g., RACH msg2). This allows the UE 610 to verify if the paging alert was genuine or false. In case the paging alert was false, at 645 the base station 605 transmits the RAR without the paging record.

At 650, the UE 610 determines whether the RAR included the paging record. In the case that the RAR did not include the paging record, at 660 the UE 605 may transmit a RACH message 3 that includes a Random-Access-Termination Indication of the paging procedure. Otherwise if the RAR did include the paging record, at 655 the UE 610 may proceed with the paging procedure and RRC connection establishment in conventional manner to retrieve data waiting for it on the network by transmitting a RACH msg3.

Figure 7:
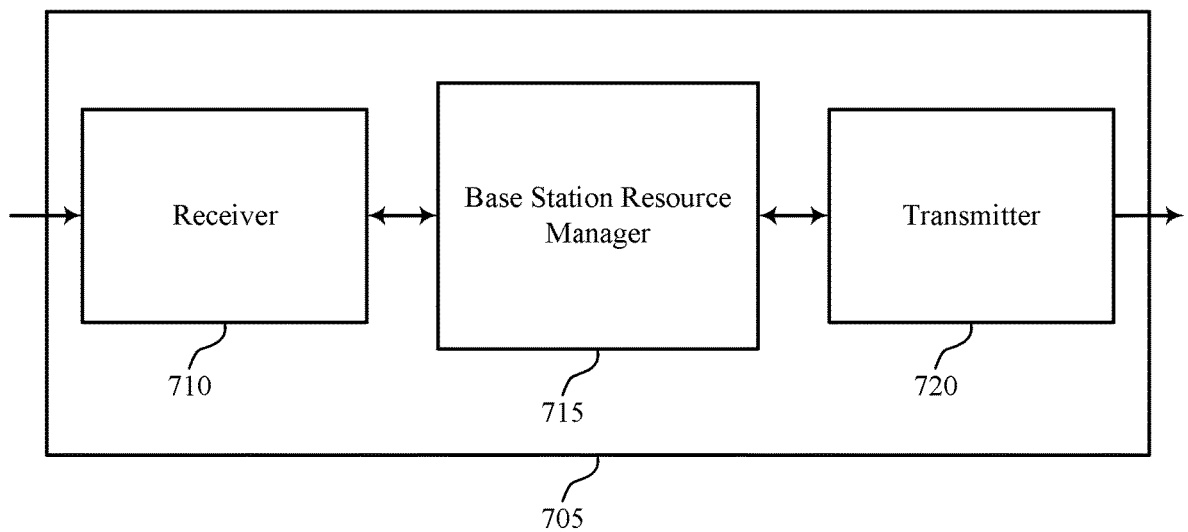
FIGS. 7 through 9 show block diagrams of a device that supports resource sharing between paging response and random access channel message in accordance with aspects of the present disclosure.

FIG. 7 shows a block diagram 700 of a wireless device 705 that supports resource sharing between paging response and random access channel message in accordance with aspects of the present disclosure. Wireless device 705 may be an example of aspects of a base station 105 as described herein. Wireless device 705 may include receiver 710, base station resource manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to resource sharing between paging response and random access channel message, etc.). Information may be passed on to other components of the device. The receiver 710 may be an example of aspects of the transceiver 1035 described with reference to FIG. 10. The receiver 710 may utilize a single antenna or a set of antennas.

Figure 10:
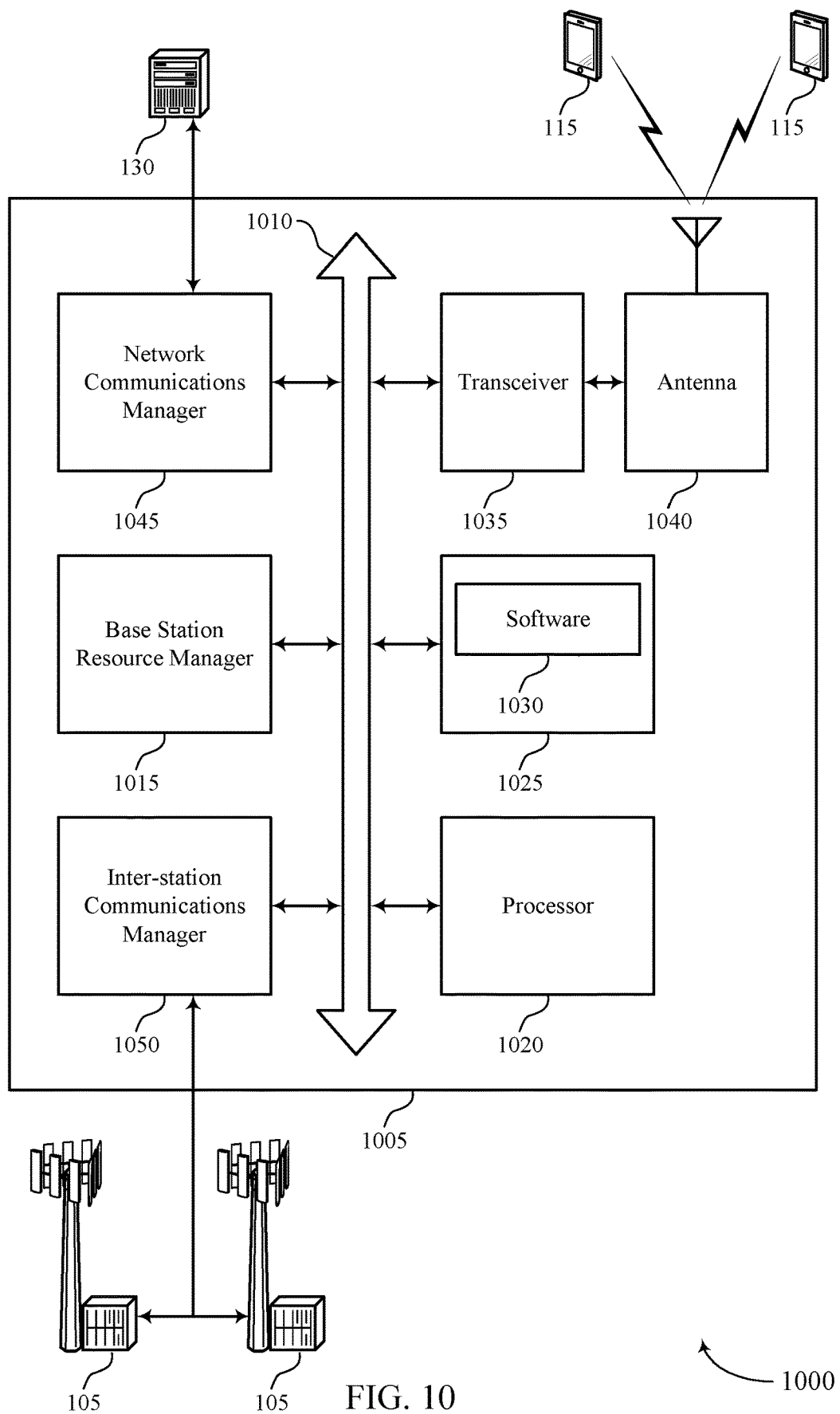
FIG. 10 illustrates a block diagram of a system including a base station that supports resource sharing between paging response and random access channel message in accordance with aspects of the present disclosure.

Base station resource manager 715 may be an example of aspects of the base station resource manager 1015 described with reference to FIG. 10.

Base station resource manager 715 and/or at least some of its various sub-components may be implemented in hardware, software executed by a processor, firmware, or any combination thereof. If implemented in software executed by a processor, the functions of the base station resource manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station resource manager 715 and/or at least some of its various sub-components may be physically located at various positions, including being distributed such that portions of functions are implemented at different physical locations by one or more physical devices. In some examples, base station resource manager 715 and/or at least some of its various sub-components may be a separate and distinct component in accordance with various aspects of the present disclosure. In other examples, base station resource manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station resource manager 715 may transmit a paging indicator message to UE(s) in a group of UEs. Base station resource manager 715 may receive, based on the paging indicator message, a first response message from the one or more UEs, the first response message received using a resource that is shared with a RACH message for the group of UEs. Base station resource manager 715 may transmit, based on the first response message, a second response message to the one or more UEs.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
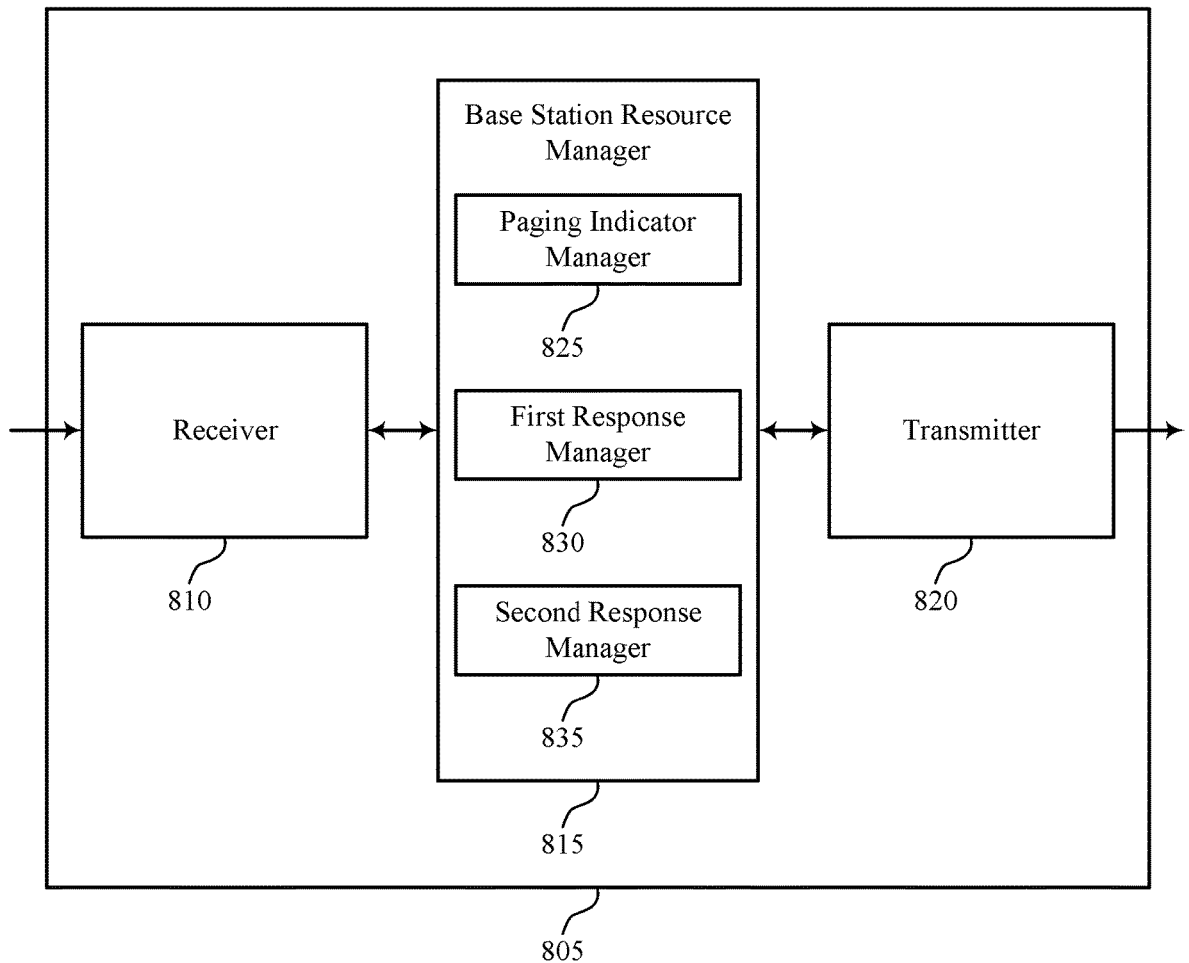

FIG. 8 shows a block diagram 800 of a wireless device 805 that supports resource sharing between paging response and random access channel message in accordance with aspects of the present disclosure. Wireless device 805 may be an example of aspects of a wireless device 705 or a base station 105 as described herein. Wireless device 805 may include receiver 810, base station resource manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to resource sharing between paging response and random access channel message, etc.). Information may be passed on to other components of the device. The receiver 810 may be an example of aspects of the transceiver 1035 described with reference to FIG. 10. The receiver 810 may utilize a single antenna or a set of antennas.

Base station resource manager 815 may be an example of aspects of the base station resource manager 1015 described with reference to FIG. 10. Base station resource manager 815 may also include paging indicator manager 825, first response manager 830, and second response manager 835.

Paging indicator manager 825 may transmit, from a base station, a paging indicator message to one or more UEs in a group of UEs.

First response manager 830 may receive, based on the paging indicator message, a first response message from the one or more UEs, the first response message received using a resource that is shared with a RACH message for the group of UEs.

Second response manager 835 may transmit, based on the first response message, a second response message to the one or more UEs.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
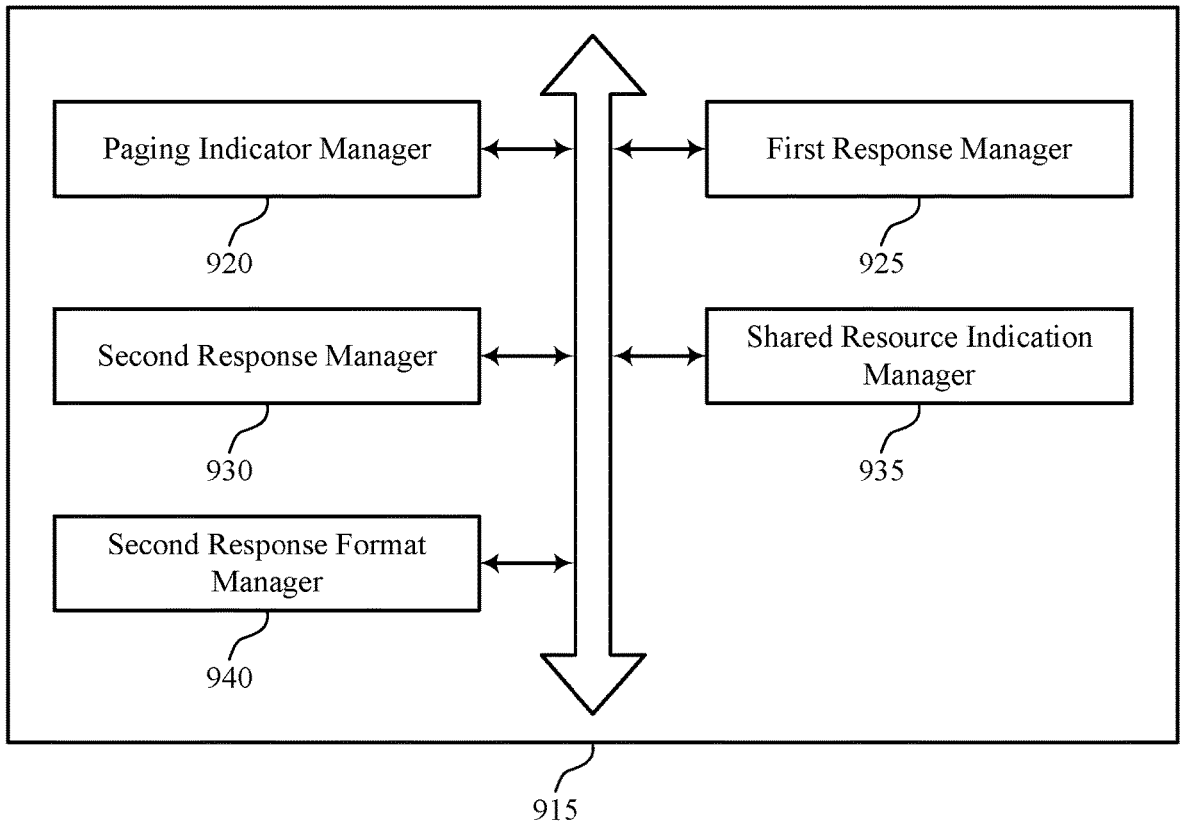

FIG. 9 shows a block diagram 900 of a base station resource manager 915 that supports resource sharing between paging response and random access channel message in accordance with aspects of the present disclosure. The base station resource manager 915 may be an example of aspects of a base station resource manager 715, a base station resource manager 815, or a base station resource manager 1015 described with reference to FIGS. 7, 8, and 10. The base station resource manager 915 may include paging indicator manager 920, first response manager 925, second response manager 930, shared resource indication manager 935, and second response format manager 940. Each of these modules may communicate, directly or indirectly, with one another (e.g., via one or more buses).

Paging indicator manager 920 may transmit, from a base station, a paging indicator message to one or more UEs in a group of UEs.

First response manager 925 may receive, based on the paging indicator message, a first response message from the one or more UEs, the first response message received using a resource that is shared with a RACH message for the group of UEs.

Second response manager 930 may transmit, based on the first response message, a second response message to the one or more UEs.

Shared resource indication manager 935 may transmit an indication of the resource that is shared between the paging response message and the RACH message. In some cases, the indication of the resource is transmitted in at least one of a RMSI, or a MIB, or an OSI, or a PDCCH, or a PDSCH, or a RRC message exchange, or a combination thereof.

Second response format manager 940 may select a format for the second response message based on a current paging load, an UE entry rate, or a combination thereof. Second response format manager 940 may transmit a random access response message as the second response message, where the random access response message includes a paging record. Second response format manager 940 may determine that the first response message comprises a paging response message, wherein the random access response message is transmitted based at least in part on the determining. Second response format manager 940 may match a RACH preamble of the first response message to a set of pre-allocated RACH preambles for a RACH msg1, wherein the determining that the first response message comprises a paging response message based at least in part on the matching. Second response format manager 940 may receive a RACH msg3 from the UE based at least in part on the paging record being associated with the UE. Second response format manager 940 may receive a RACH msg3 from the UE that comprises a RACH termination indication based at least in part on the paging record not being associated with the UE.

In some aspects, second response format manager 940 may transmit a paging message as the second response message, receive, based on the paging message, a RACH msg1 from the one or more UEs, and transmit a RACH msg2 as a third response message. Second response format manager 940 may determine that the first response message includes a RACH msg1. Second response format manager 940 may determine that the first response message includes a paging response message. Second response format manager 940 may receive, based on the RACH msg2, a message from the one or more UEs, where the message conveys an indication that the one or more UEs has responded to the paging indicator. Second response format manager 940 may transmit a paging message as a third response message, receive, based on the RACH msg2, a RACH msg3 from the one or more UEs, transmit a connection establishment message as a third response message, and transmit a RACH msg2 as the second response message. In some examples, the paging message is transmitted in a RACH message. In some examples, the RACH message is a RACH preamble message FIG. 10 shows a diagram of a system 1000 including a device 1005 that supports resource sharing between paging response and random access channel message in accordance with aspects of the present disclosure. Device 1005 may be an example of or include the components of wireless device 705, wireless device 805, or a base station 105 as described herein. Device 1005 may include components for bi-directional voice and data communications including components for transmitting and receiving communications, including base station resource manager 1015, processor 1020, memory 1025, software 1030, transceiver 1035, antenna 1040, network communications manager 1045, and inter-station communications manager 1050. These components may be in electronic communication via one or more busses (e.g., bus 1010). Device 1005 may communicate wirelessly with one or more UEs 115.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting resource sharing between paging response and random access channel message).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware and/or software operation such as the interaction with peripheral components or devices.

Software 1030 may include code to implement aspects of the present disclosure, including code to support resource sharing between paging response and random access channel message. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105, and may include a controller or scheduler for controlling communications with UEs 115 in cooperation with other base stations 105. For example, the inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
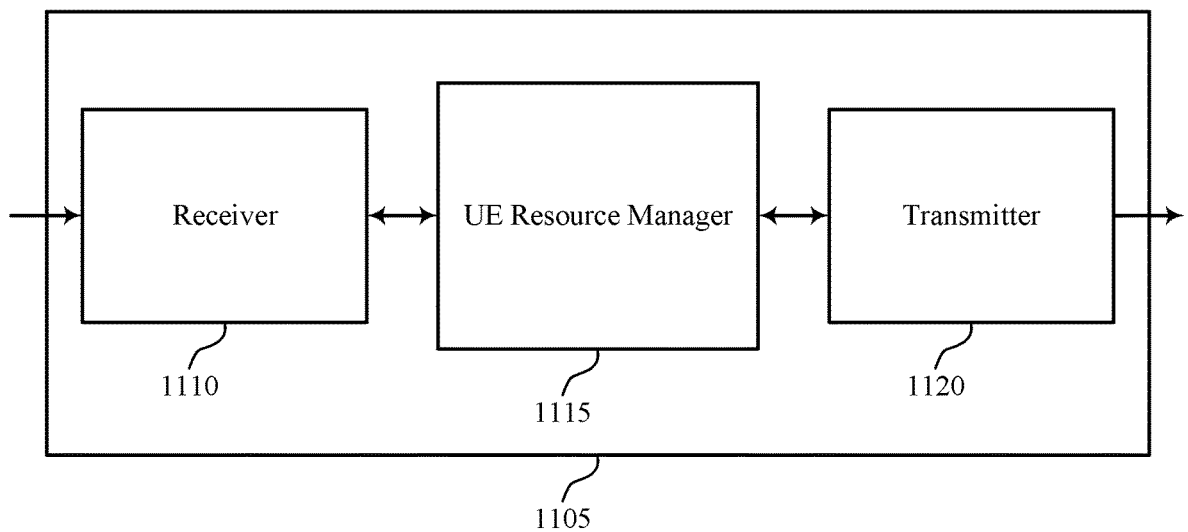
FIGS. 11 through 13 show block diagrams of a device that supports resource sharing between paging response and random access channel message in accordance with aspects of the present disclosure.

FIG. 11 shows a block diagram 1100 of a wireless device 1105 that supports resource sharing between paging response and random access channel message in accordance with aspects of the present disclosure. Wireless device 1105 may be an example of aspects of a UE 115 as described herein. Wireless device 1105 may include receiver 1110, UE resource manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to resource sharing between paging response and random access channel message, etc.). Information may be passed on to other components of the device. The receiver 1110 may be an example of aspects of the transceiver 1435 described with reference to FIG. 14. The receiver 1110 may utilize a single antenna or a set of antennas.

UE resource manager 1115 may be an example of aspects of the UE resource manager 1415 described with reference to FIG. 14.

UE resource manager 1115 and/or at least some of its various sub-components may be implemented in hardware, software executed by a processor, firmware, or any combination thereof. If implemented in software executed by a processor, the functions of the UE resource manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE resource manager 1115 and/or at least some of its various sub-components may be physically located at various positions, including being distributed such that portions of functions are implemented at different physical locations by one or more physical devices. In some examples, UE resource manager 1115 and/or at least some of its various sub-components may be a separate and distinct component in accordance with various aspects of the present disclosure. In other examples, UE resource manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE resource manager 1115 may receive, at a UE, an indication of a resource that is shared with a RACH message. UE resource manager 1115 may receive, from a base station, a paging indicator message. UE resource manager 1115 may select at least one of the paging response message or the RACH message as a first response message to the paging indicator message. UE resource manager 1115 may transmit the first response message to the base station using the resource.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
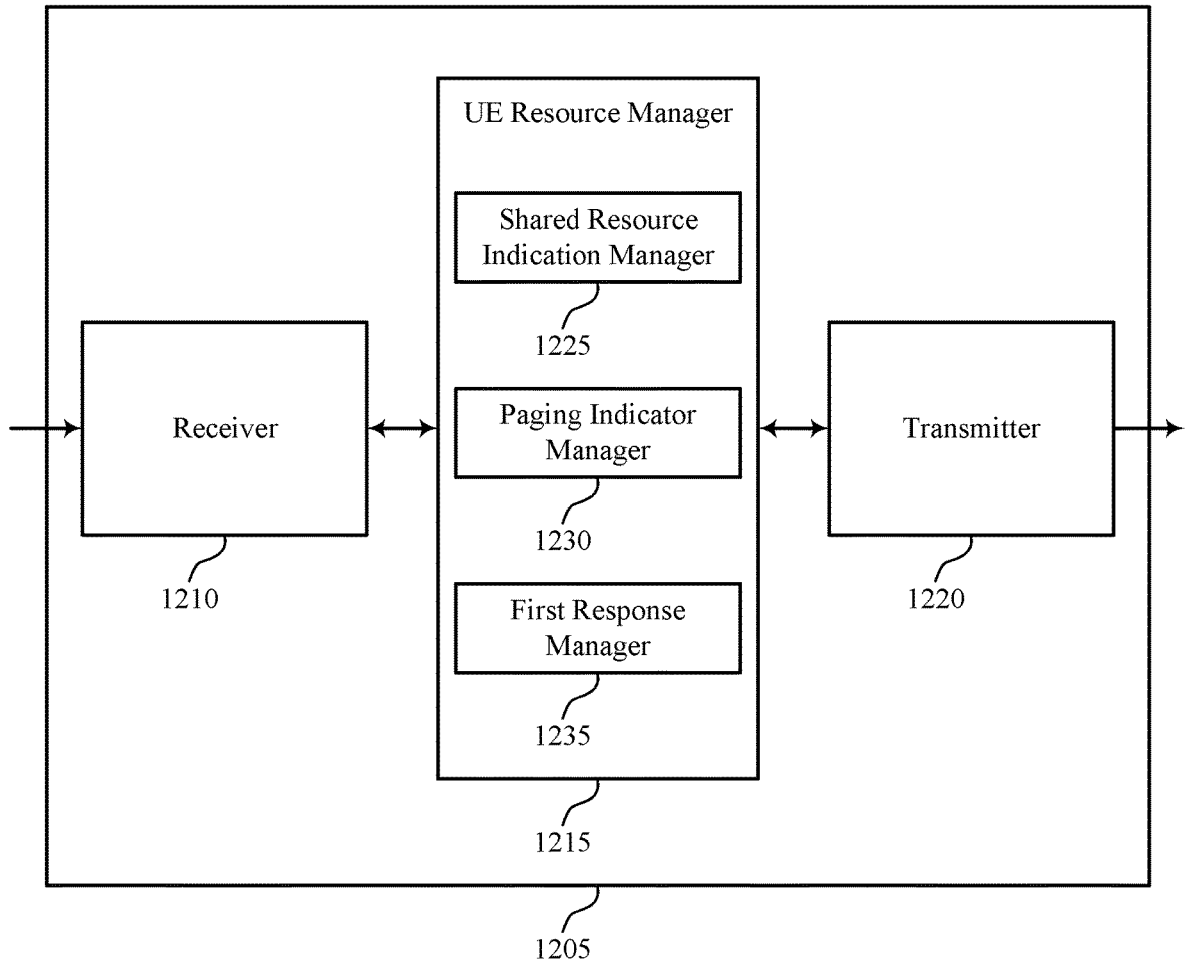

FIG. 12 shows a block diagram 1200 of a wireless device 1205 that supports resource sharing between paging response and random access channel message in accordance with aspects of the present disclosure. Wireless device 1205 may be an example of aspects of a wireless device 1105 or a UE 115 as described herein. Wireless device 1205 may include receiver 1210, UE resource manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to resource sharing between paging response and random access channel message, etc.). Information may be passed on to other components of the device. The receiver 1210 may be an example of aspects of the transceiver 1435 described with reference to FIG. 14. The receiver 1210 may utilize a single antenna or a set of antennas.

UE resource manager 1215 may be an example of aspects of the UE resource manager 1415 described with reference to FIG. 14. UE resource manager 1215 may also include shared resource indication manager 1225, paging indicator manager 1230, and first response manager 1235.

Shared resource indication manager 1225 may receive, at a UE, an indication of a resource that is shared with a RACH message. Shared resource indication manager 1225 may receive the indication of the resource in at least one of a RMSI, or a MIB, or an OSI, or a PDCCH, or a PDSCH, or a RRC message exchange, or a combination thereof.

Paging indicator manager 1230 may receive, from a base station, a paging indicator message.

First response manager 1235 may select at least one of the paging response message or the RACH message as a first response message to the paging indicator message and transmit the first response message to the base station using the resource.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
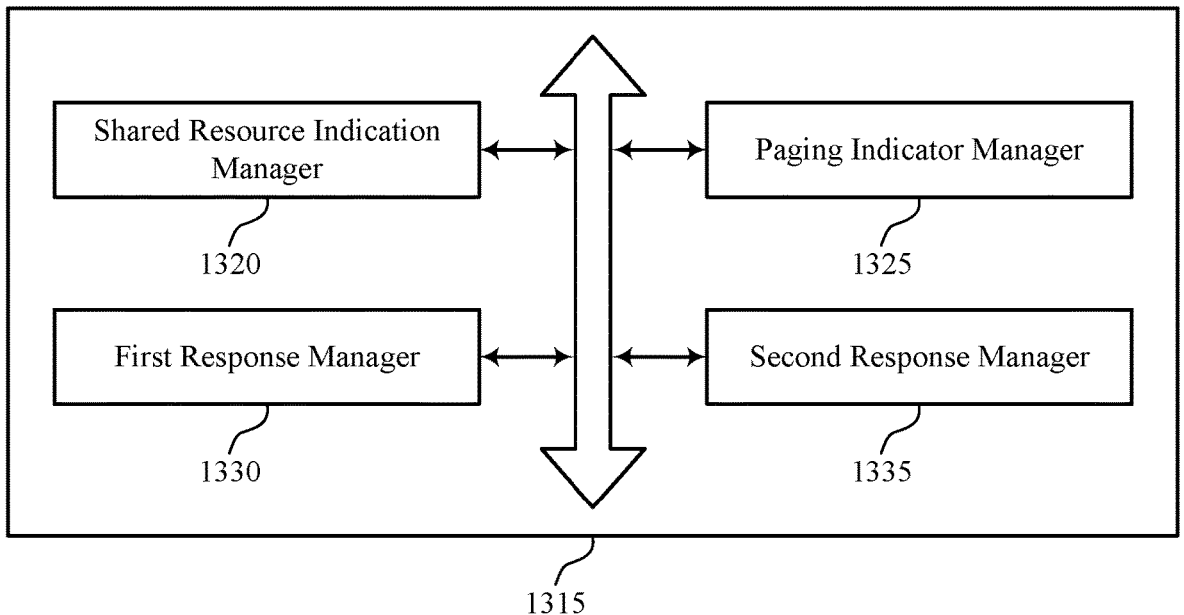

FIG. 13 shows a block diagram 1300 of a UE resource manager 1315 that supports resource sharing between paging response and random access channel message in accordance with aspects of the present disclosure. The UE resource manager 1315 may be an example of aspects of a UE resource manager 1415 described with reference to FIGS. 11, 12, and 14. The UE resource manager 1315 may include shared resource indication manager 1320, paging indicator manager 1325, first response manager 1330, and second response manager 1335. Each of these modules may communicate, directly or indirectly, with one another (e.g., via one or more buses).

Shared resource indication manager 1320 may receive, at a UE, an indication of a resource that is shared with a RACH message. Shared resource indication manager 1320 may receive the indication of the resource in at least one of a RMSI, or a MIB, or an OSI, or a PDCCH, or a PDSCH, or a RRC message exchange, or a combination thereof.

Paging indicator manager 1325 may receive, from a base station, a paging indicator message.

First response manager 1330 may select at least one of the paging response message or the RACH message as a first response message to the paging indicator message and transmit the first response message to the base station using the resource.

Second response manager 1335 may receive a second response message from the base station and select, based on the second response message, a third response message for transmission to the base station, the third response message including a RACH msg1, a RACH msg3, or a message conveying an indication that the UE has responded to the paging indicator.

Figure 14:
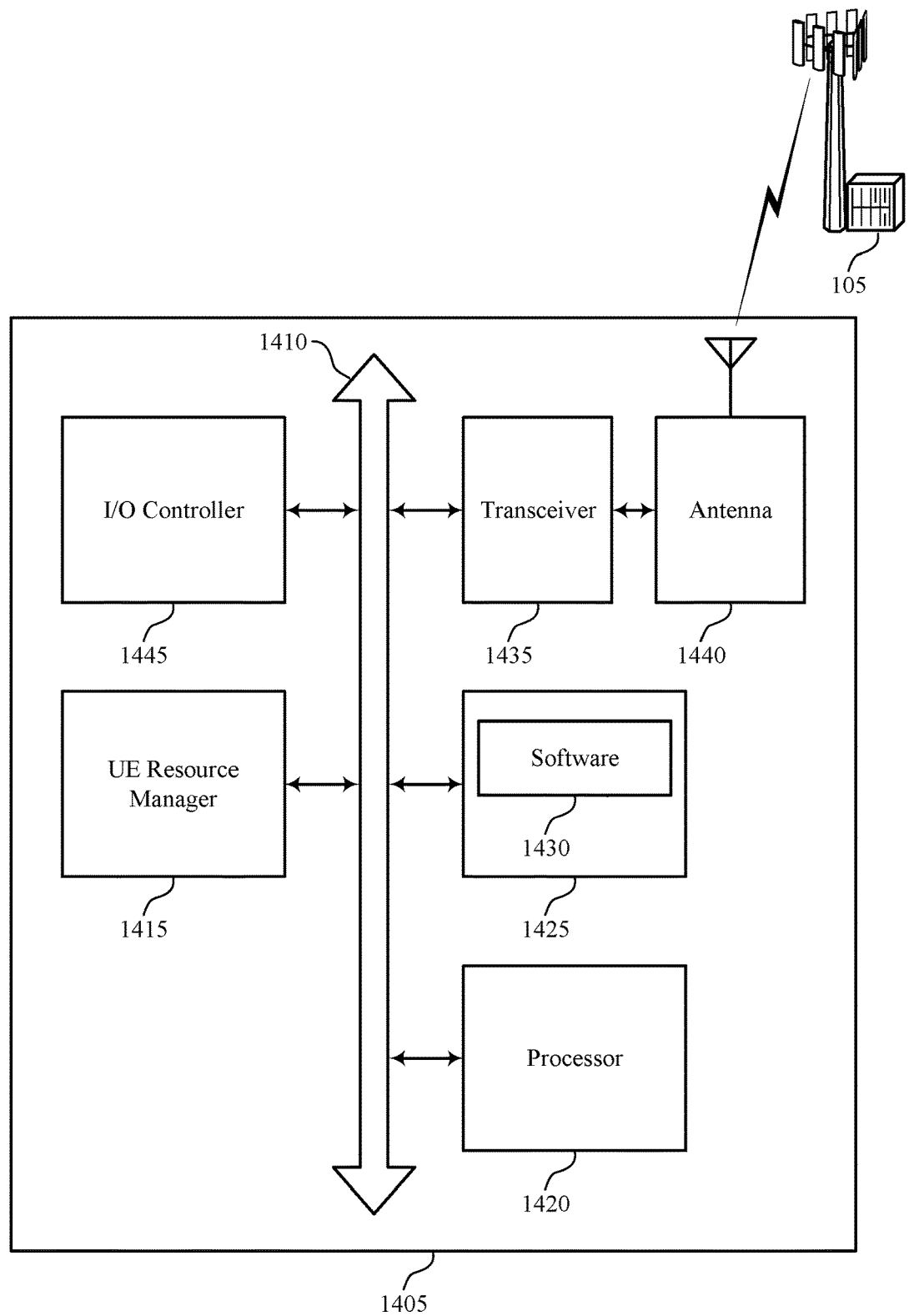
FIG. 14 illustrates a block diagram of a system including a UE that supports resource sharing between paging response and random access channel message in accordance with aspects of the present disclosure.

FIG. 14 shows a diagram of a system 1400 including a device 1405 that supports resource sharing between paging response and random access channel message in accordance with aspects of the present disclosure. Device 1405 may be an example of or include the components of UE 115 as described herein. Device 1405 may include components for bi-directional voice and data communications including components for transmitting and receiving communications, including UE resource manager 1415, processor 1420, memory 1425, software 1430, transceiver 1435, antenna 1440, and I/O controller 1445. These components may be in electronic communication via one or more busses (e.g., bus 1410). Device 1405 may communicate wirelessly with one or more base stations 105.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting resource sharing between paging response and random access channel message).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware and/or software operation such as the interaction with peripheral components or devices.

Software 1430 may include code to implement aspects of the present disclosure, including code to support resource sharing between paging response and random access channel message. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described above. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas.

In some cases, the wireless device may include a single antenna 1440. However, in some cases the device may have more than one antenna 1440, which may be capable of concurrently transmitting or receiving multiple wireless transmissions.

I/O controller 1445 may manage input and output signals for device 1405. I/O controller 1445 may also manage peripherals not integrated into device 1405. In some cases, I/O controller 1445 may represent a physical connection or port to an external peripheral. In some cases, I/O controller 1445 may utilize an operating system such as iOS®, ANDROID®, MS-DOS®, MS-WINDOWS®, OS/2®, UNIX®, LINUX®, or another known operating system. In other cases, I/O controller 1445 may represent or interact with a modem, a keyboard, a mouse, a touchscreen, or a similar device. In some cases, I/O controller 1445 may be implemented as part of a processor. In some cases, a user may interact with device 1405 via I/O controller 1445 or via hardware components controlled by I/O controller 1445.

Figure 15:
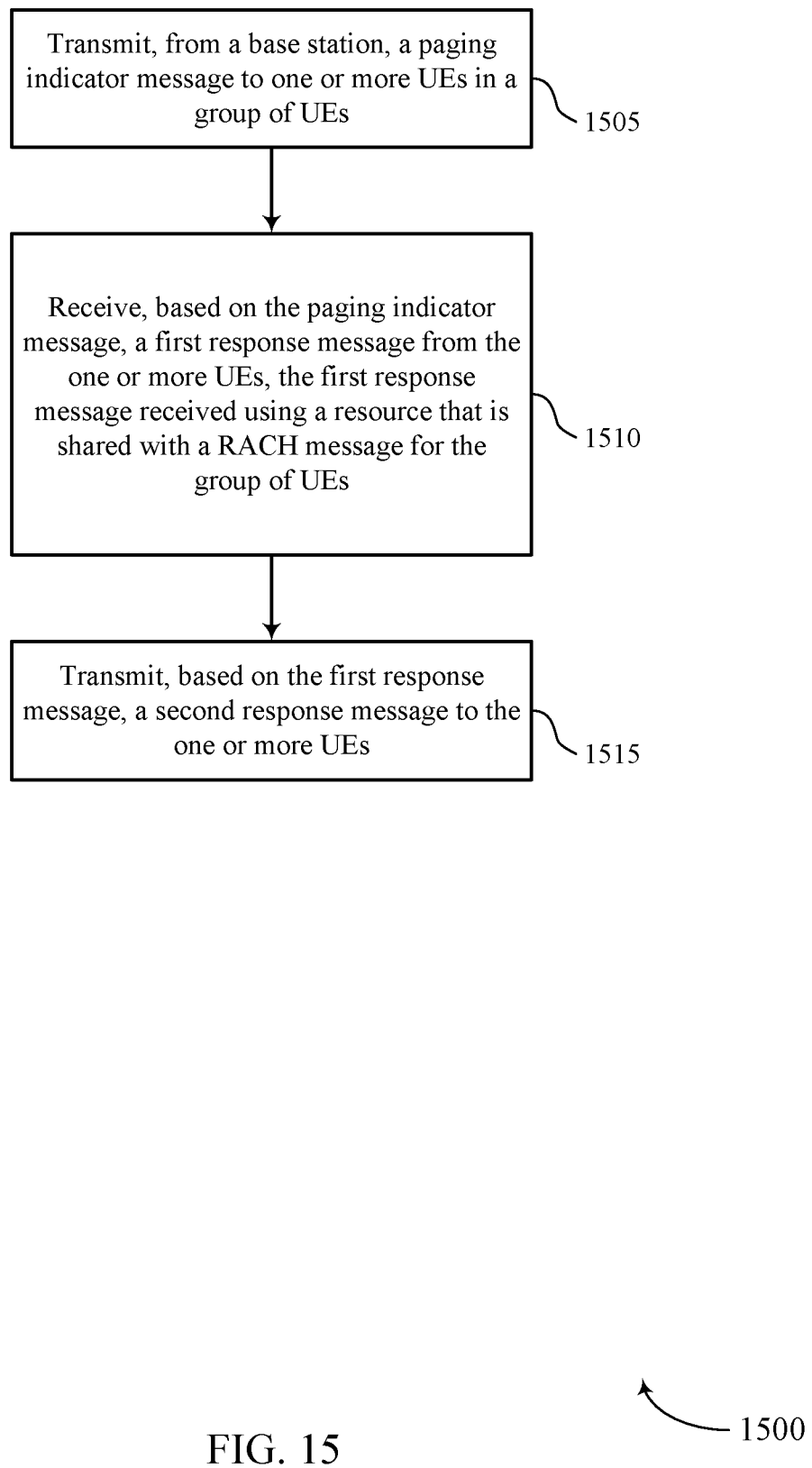
FIGS. 15 through 17 illustrate methods for resource sharing between paging response and random access channel message in accordance with aspects of the present disclosure.

FIG. 15 shows a flowchart illustrating a method 1500 for resource sharing between paging response and random access channel message in accordance with aspects of the present disclosure. The operations of method 1500 may be implemented by a base station 105 or its components as described herein. For example, the operations of method 1500 may be performed by a base station resource manager as described with reference to FIGS. 7 through 10. In some examples, a base station 105 may execute a set of codes to control the functional elements of the device to perform the functions described below. Additionally, or alternatively, the base station 105 may perform aspects of the functions described below using special-purpose hardware.

At block 1505 the base station 105 may transmit, from a base station, a paging indicator message to one or more UEs in a group of UEs. The operations of block 1505 may be performed according to the methods described herein. In certain examples, aspects of the operations of block 1505 may be performed by a paging indicator manager as described with reference to FIGS. 7 through 10.

At block 1510 the base station 105 may receive, based at least in part on the paging indicator message, a first response message from the one or more UEs, the first response message received using a resource that is shared with a RACH message for the group of UEs. The operations of block 1510 may be performed according to the methods described herein. In certain examples, aspects of the operations of block 1510 may be performed by a first response manager as described with reference to FIGS. 7 through 10.

At block 1515 the base station 105 may transmit, based at least in part on the first response message, a second response message to the one or more UEs. The operations of block 1515 may be performed according to the methods described herein. In certain examples, aspects of the operations of block 1515 may be performed by a second response manager as described with reference to FIGS. 7 through 10.

Figure 16:
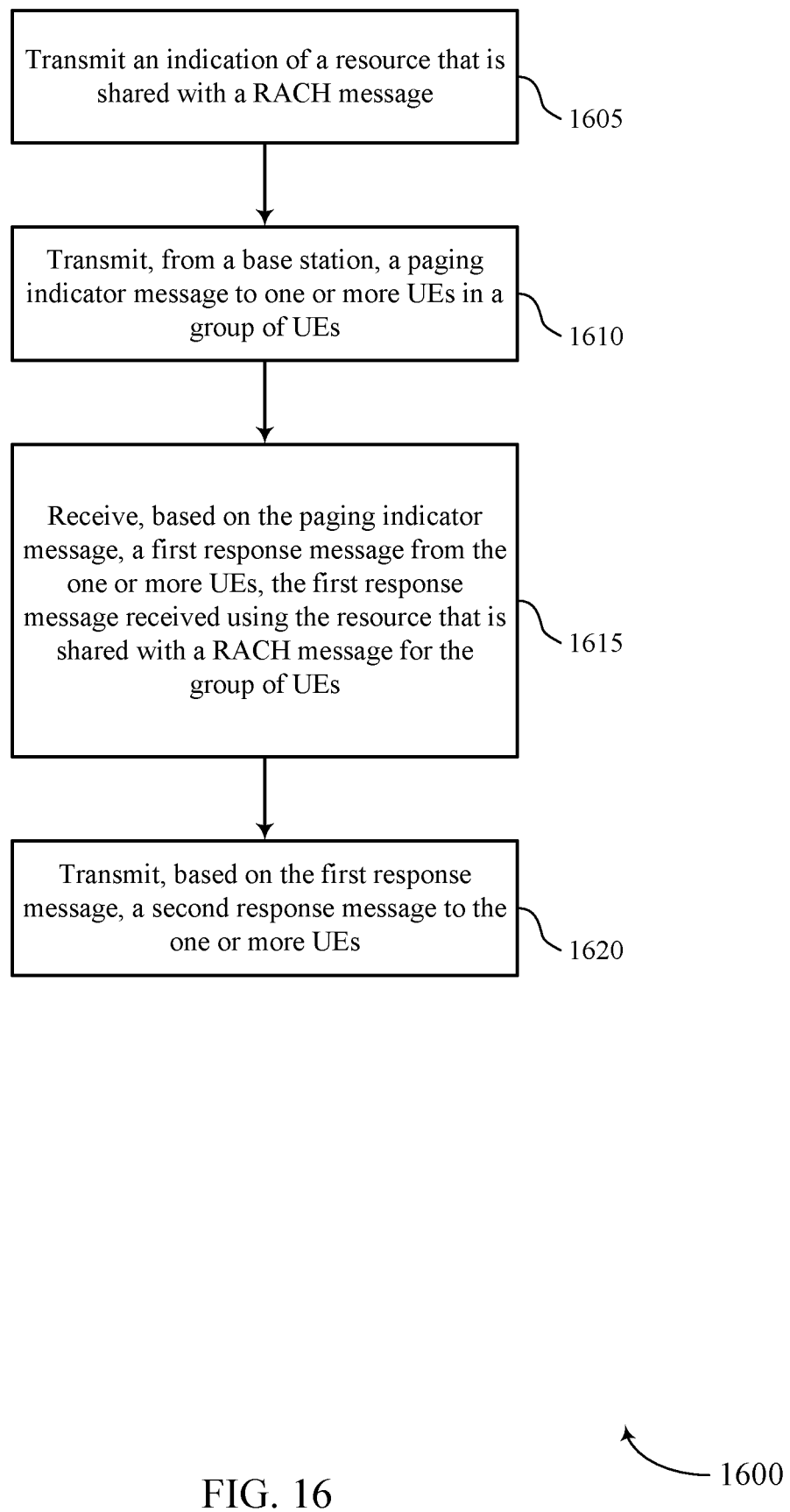

FIG. 16 shows a flowchart illustrating a method 1600 for resource sharing between paging response and random access channel message in accordance with aspects of the present disclosure. The operations of method 1600 may be implemented by a base station 105 or its components as described herein. For example, the operations of method 1600 may be performed by a base station resource manager as described with reference to FIGS. 7 through 10. In some examples, a base station 105 may execute a set of codes to control the functional elements of the device to perform the functions described below. Additionally, or alternatively, the base station 105 may perform aspects of the functions described below using special-purpose hardware.

At block 1605 the base station 105 may transmit an indication of the resource that is shared between the paging response message and the RACH message. The operations of block 1605 may be performed according to the methods described herein. In certain examples, aspects of the operations of block 1605 may be performed by a shared resource indication manager as described with reference to FIGS. 7 through 10.

At block 1610 the base station 105 may transmit, from a base station, a paging indicator message to one or more UEs in a group of UEs. The operations of block 1610 may be performed according to the methods described herein. In certain examples, aspects of the operations of block 1610 may be performed by a paging indicator manager as described with reference to FIGS. 7 through 10.

At block 1615 the base station 105 may receive, based at least in part on the paging indicator message, a first response message from the one or more UEs, the first response message received using a resource that is shared with a RACH message for the group of UEs. The operations of block 1615 may be performed according to the methods described herein. In certain examples, aspects of the operations of block 1615 may be performed by a first response manager as described with reference to FIGS. 7 through 10.

At block 1620 the base station 105 may transmit, based at least in part on the first response message, a second response message to the one or more UEs. The operations of block 1620 may be performed according to the methods described herein. In certain examples, aspects of the operations of block 1620 may be performed by a second response manager as described with reference to FIGS. 7 through 10.

Figure 17:
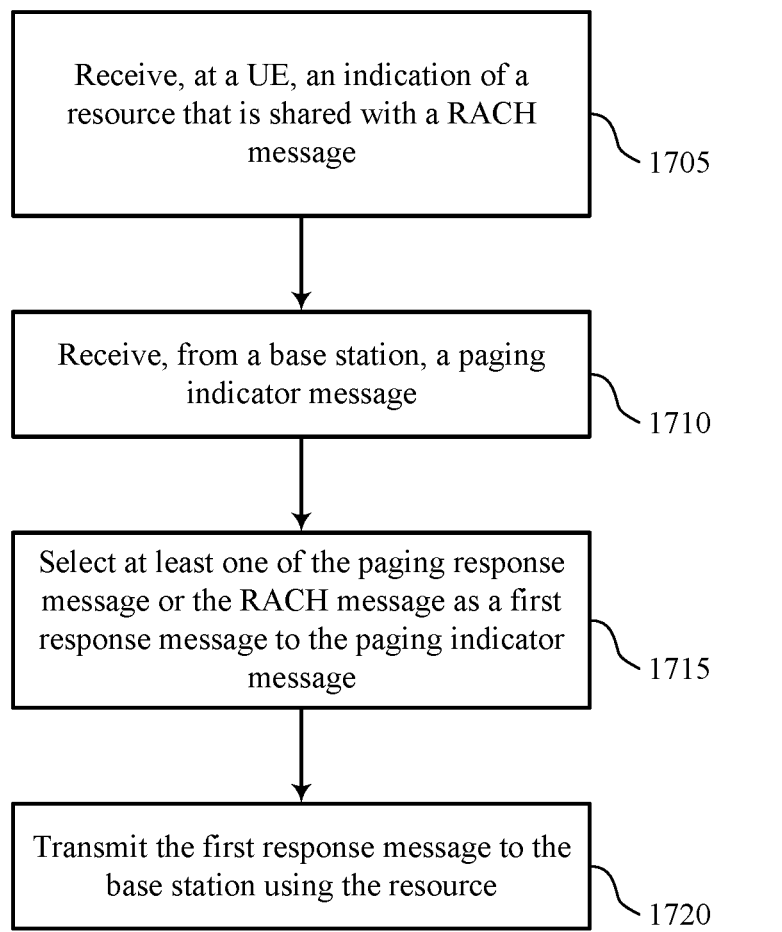

FIG. 17 shows a flowchart illustrating a method 1700 for resource sharing between paging response and random access channel message in accordance with aspects of the present disclosure. The operations of method 1700 may be implemented by a UE 115 or its components as described herein. For example, the operations of method 1700 may be performed by a UE resource manager as described with reference to FIGS. 11 through 14. In some examples, a UE 115 may execute a set of codes to control the functional elements of the device to perform the functions described below. Additionally, or alternatively, the UE 115 may perform aspects of the functions described below using special-purpose hardware.

At block 1705 the UE 115 may receive an indication of a resource that is shared with a RACH message. The operations of block 1705 may be performed according to the methods described herein. In certain examples, aspects of the operations of block 1705 may be performed by a shared resource indication manager as described with reference to FIGS. 11 through 14.

At block 1710 the UE 115 may receive, from a base station, a paging indicator message. The operations of block 1710 may be performed according to the methods described herein. In certain examples, aspects of the operations of block 1710 may be performed by a paging indicator manager as described with reference to FIGS. 11 through 14.

At block 1715 the UE 115 may select at least one of the paging response message or the RACH message as a first response message to the paging indicator message. The operations of block 1715 may be performed according to the methods described herein. In certain examples, aspects of the operations of block 1715 may be performed by a first response manager as described with reference to FIGS. 11 through 14.

At block 1720 the UE 115 may transmit the first response message to the base station using the resource. The operations of block 1720 may be performed according to the methods described herein. In certain examples, aspects of the operations of block 1720 may be performed by a first response manager as described with reference to FIGS. 11 through 14.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communication system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    receiving, at a user equipment (UE), an indication of a resource that is shared with a random access channel (RACH) message;
    receiving, from a network entity, a paging indicator message associated with one or more UEs in a group of UEs, the paging indicator message comprising a compressed paging index corresponding to the group of UEs;
    selecting at least one of a paging response message or the RACH message as a first response message to the paging indicator message; and
    transmitting the first response message to the network entity using the resource.

2. The method of claim 1, further comprising:
    receiving a second response message from the network entity; and
    selecting, based at least in part on the second response message, a third response message for transmission to the network entity, the third response message comprising a RACH msg1, a RACH msg3, or a message conveying an indication that the UE has responded to the paging indicator message.

3. The method of claim 2, wherein a format for the second response message is based at least in part on a current paging load, an UE entry rate, or a combination thereof.

4. The method of claim 2, wherein the first response message is the paging response message and wherein the second response message is a paging message.

5. The method of claim 4, wherein the third response message comprises the RACH msg1, the method further comprising:
    receiving a RACH msg2 based at least in part on the third response message.

6. The method of claim 2, wherein the second response message is a random access response message comprising a paging message.

7. The method of claim 1, further comprising:
    receiving the indication of the resource in at least one of a remaining minimum system information (RMSI), or a master information block (MIB), or an other system information (OSI), or a physical downlink control channel (PDCCH), or a physical downlink shared channel (PDSCH), or a radio resource control (RRC) message exchange, or a combination thereof.

8. The method of claim 1, wherein the first response message comprises a RACH msg1, the method further comprising:
    receiving a RACH msg2 as a second response message from the network entity.

9. An apparatus for wireless communication, comprising:
    means for receiving, at a user equipment (UE), an indication of a resource that is shared with a random access channel (RACH) message;
    means for receiving, from a network entity, a paging indicator message associated with one or more UEs in a group of UEs, the paging indicator message comprising a compressed paging index corresponding to the group of UEs;

means for selecting at least one of a paging response message or the RACH message as a first response message to the paging indicator message; and
means for transmitting the first response message to the network entity using the resource.

10. The apparatus of claim 9, further comprising:
means for receiving a second response message from the network entity; and
means for selecting, based at least in part on the second response message, a third response message for transmission to the network entity, the third response message comprising a RACH msg1, a RACH msg3, or a message conveying an indication that the UE has responded to the paging indicator message.

11. The apparatus of claim 10, wherein a format for the second response message is based at least in part on a current paging load, an UE entry rate, or a combination thereof.

12. The apparatus of claim 10, wherein the first response message is the paging response message and wherein the second response message is a paging message.

13. The apparatus of claim 12, wherein the third response message comprises the RACH msg1, the apparatus further comprising:
means for receiving a RACH msg2 based at least in part on the third response message.

14. The apparatus of claim 10, wherein the second response message is a random access response message comprising a paging message.

15. The apparatus of claim 9, further comprising:
means for receiving the indication of the resource in at least one of a remaining minimum system information (RMSI), or a master information block (MIB), or an other system information (OSI), or a physical downlink control channel (PDCCH), or a physical downlink shared channel (PDSCH), or a radio resource control (RRC) message exchange, or a combination thereof.

16. The apparatus of claim 9, wherein the first response message comprises a RACH msg1, the apparatus further comprising:
means for receiving a RACH msg2 as a second response message from the network entity.

17. An apparatus for wireless communication, comprising:
one or more processors;
memory in electronic communication with the one or more processors; and
instructions stored in the memory and operable, when executed by the one or more processors, to cause the apparatus to:
receive, at a user equipment (UE), an indication of a resource that is shared between a paging response message and a random access channel (RACH) message;
receive, from a network entity, a paging indicator message associated with one or more UEs in a group of UEs, the paging indicator message comprising a compressed paging index corresponding to the group of UEs;
select at least one of a paging response message or the RACH message as a first response message to the paging indicator message; and
transmit the first response message to the network entity using the resource.

18. The apparatus of claim 17, wherein the instructions are further executable by the one or more processors to:
receive a second response message from the network entity; and
select, based at least in part on the second response message, a third response message for transmission to the network entity, the third response message comprising a RACH msg1, a RACH msg3, or a message conveying an indication that the UE has responded to the paging indicator message.

19. The apparatus of claim 18, wherein a format for the second response message is based at least in part on a current paging load, an UE entry rate, or a combination thereof.

20. The apparatus of claim 18, wherein the first response message is the paging response message and wherein the second response message is a paging message.

21. The apparatus of claim 20, wherein the third response message comprises the RACH msg1, and wherein the instructions are further executable by the one or more processors to:
receive a RACH msg2 based at least in part on the third response message.

22. The apparatus of claim 18, wherein the second response message is a random access response message comprising a paging message.

23. The apparatus of claim 17, wherein the instructions are further executable by the one or more processors to:
receive the indication of the resource in at least one of a minimum system information block (MSIB), or a master information block (MIB), or a physical downlink control channel (PDCCH), or a physical downlink shared channel (PDSCH), or a radio resource control (RRC) message exchange, or a combination thereof.

24. The apparatus of claim 17, wherein the first response message comprises a RACH msg1, and wherein the instructions are further executable by the one or more processors to:
receiving a RACH msg2 as a second response message from the network entity.

25. A non-transitory computer readable medium storing code for wireless communication, the code comprising instructions executable by one or more processors to:
receive, at a user equipment (UE), an indication of a resource that is shared between a paging response message and a random access channel (RACH) message;
receive, from a network entity, a paging indicator message associated with one or more UEs in a group of UEs, the paging indicator message comprising a compressed paging index corresponding to the group of UEs;
select at least one of a paging response message or the RACH message as a first response message to the paging indicator message; and
transmit the first response message to the network entity using the resource.

26. The non-transitory computer readable medium of claim 25, wherein the code further comprises instructions executable by the one or more processors to:
receive a second response message from the network entity; and
select, based at least in part on the second response message, a third response message for transmission to the network entity, the third response message comprising a RACH msg1, a RACH msg3, or a message conveying an indication that the UE has responded to the paging indicator message.

27. The non-transitory computer readable medium of claim 26, wherein a format for the second response message is based at least in part on a current paging load, an UE entry rate, or a combination thereof.

28. The non-transitory computer readable medium of claim 26, wherein the first response message is the paging response message and wherein the second response message is a paging message.

29. The non-transitory computer readable medium of claim 28, wherein the third response message comprises the RACH msg1, and wherein the code further comprises instructions executable by the one or more processors to:
   receive a RACH msg2 based at least in part on the third response message.

30. The non-transitory computer readable medium of claim 25, wherein the code further comprises instructions executable by the one or more processors to:
   receive the indication of the resource in at least one of a minimum system information block (MSIB), or a master information block (MIB), or a physical downlink control channel (PDCCH), or a physical downlink shared channel (PDSCH), or a radio resource control (RRC) message exchange, or a combination thereof.

* * * * *